US012789627B2

(12) United States Patent
Pezeshkfar et al.

(10) Patent No.: US 12,789,627 B2
(45) Date of Patent: Nov. 10, 2026

(54) IN-VEHICLE ENTERTAINMENT SYSTEM OPERATION USING BILATERAL MATCHING OF ARTIFICIAL INTELLIGENCE (AI) BASED INFORMATION

(71) Applicant: Panasonic Avionics Corporation, Irvine, CA (US)

(72) Inventors: Saeed Pezeshkfar, Laguna Niguel, CA (US); Robert Kasody, Costa Mesa, CA (US); FaizalSheriff Kalifullah Sheriff, Rancho Santa Margarita, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 100 days.

(21) Appl. No.: 18/911,161

(22) Filed: Oct. 9, 2024

(65) Prior Publication Data

US 2026/0008343 A1 Jan. 8, 2026

Related U.S. Application Data

(60) Provisional application No. 63/667,493, filed on Jul. 3, 2024, provisional application No. 63/667,075, filed on Jul. 2, 2024.

(51) Int. Cl.

*B60K 35/28* (2024.01)
*B60W 40/08* (2012.01)
*H04N 21/414* (2011.01)

(52) U.S. Cl.

CPC ............. *B60K 35/28* (2024.01); *B60W 40/08* (2013.01); *H04N 21/41422* (2013.01)

(58) Field of Classification Search

CPC .......... B60K 2360/16; B60K 2360/179; B60K 35/02; B60W 40/08; H04N 21/41422

(Continued)

(56) References Cited

U.S. PATENT DOCUMENTS 10,134,290 B2 * 11/2018 Mikan .................. G06Q 10/083
11,958,608 B1 * 4/2024 Tran ..................... H04N 21/214

(Continued)

FOREIGN PATENT DOCUMENTS

WO 2023167758 A1 9/2023
WO 2026010998 A1 1/2026

OTHER PUBLICATIONS

International Search Report and Written Opinion issued Aug. 8, 2025, in International PCT Application No. PCT/US2025/036146 (13 pages).

*Primary Examiner* — Andrew Joseph Rudy

(74) *Attorney, Agent, or Firm* — Ashurst Perkins Coie US LLP

(57) ABSTRACT

Machine learning (ML)/artificial intelligence (AI) assistance is provided for the operation of an inflight entertainment network. A system may include a client agent deployed in communication with a passenger's personal device, a service agent deployed at least in part outside the vehicle and a cloud agent implemented remotely from the vehicle. The client agent is configured to collect passenger-facing AI-based insights with its own AI/ML model, the insights related to passenger preferences for in-vehicle services. The service agent is configured to collect services-facing AI-based insights representing interactions between passengers and available services and similarities among available services. The cloud agent implements a matching engine that bilaterally uses the passenger-facing insights and the services-facing insights to connect a passenger with an onboard service. The communication between the client agent, service agent, and the cloud agent can span multiple mobility stages of a travel journey.

20 Claims, 10 Drawing Sheets

(58) Field of Classification Search
USPC .......................................................... 701/36
See application file for complete search history.

(56) References Cited

U.S. PATENT DOCUMENTS

| | | | | |
|---|---|---|---|---|
| 12,231,381 | B2 * | 2/2025 | Bax | H04L 51/043 |
| 12,509,097 | B2 * | 12/2025 | Zahid | B60W 50/0098 |
| 2019/0115027 | A1 | 4/2019 | Shah et al. | |
| 2019/0191214 | A1 | 6/2019 | Mandavilli et al. | |
| 2020/0238933 | A1 | 7/2020 | Sobhany | |

* cited by examiner

IN-VEHICLE ENTERTAINMENT SYSTEM OPERATION USING BILATERAL MATCHING OF ARTIFICIAL INTELLIGENCE (AI) BASED INFORMATION

CROSS-REFERENCE TO RELATED APPLICATIONS

This application claims priority to, and the benefit of, U.S. Provisional Application No. 63/667,493, titled IN-FLIGHT ENTERTAINMENT SYSTEM OPERATION USING AI ASSISTANCE and filed on Jul. 3, 2024, and U.S. Provisional Application No. 63/667,075, titled IN-FLIGHT ENTERTAINMENT SYSTEM OPERATION USING AI ASSISTANCE and filed on Jul. 2, 2024. The contents of each of the aforementioned applications are herein incorporated by reference in their respective entireties, including any drawings and appendices.

TECHNICAL FIELD

This application is related to the operation of an in-flight entertainment system.

BACKGROUND

Commercial travel has evolved to provide entertainment options to passengers traveling to their destinations. For example, in an airplane or train, entertainment options are provided on monitors located on the back of seats, where the monitors can enable passengers to watch movies or television shows as they travel to their destinations. Passenger vehicles have also begun to provide connectivity tools that may provide additional opportunities to passengers for entertainment or productivity.

SUMMARY

The present document provides various techniques for use of machine learning or artificial intelligence in the operation of in-flight entertainment network.

In one example aspect, a disclosed system for providing in-flight connectivity comprises a client agent configured to communicate sensor data with one or more human-machine interfaces (HMI) deployed in an airplane; a service agent configured to communicate information with one or more service servers, wherein the service servers are configured to provide services to passengers on the airplane; and a cloud engine deployed on a computing platform that is remote from the airplane, the cloud engine communicatively coupled to the client agent and the service agent and configured to receive (a) sensor information from the client agent and metric information from the service agent, (b) train a machine learning model according to received sensor information and metric information, and (c) provide user interactivity information to the client agent and operational rules to the service agent according to a rule.

In another example aspect, a method of providing in-flight, comprising: operating a client agent to communicate sensor data with one or more human-machine interfaces (HMI) deployed in an airplane; operating a service agent to communicate information with one or more service servers, wherein the service servers are configured to provide services to passengers on the airplane; and operating a cloud engine (deployed on a computing platform that is remote from the airplane, the cloud engine communicatively coupled to the client agent and the service agent and configured to receive (a) sensor information from the client agent and metric information from the service agent, (b) train a machine learning model according to received sensor information and metric information, and (c) provide user interactivity information to the client agent and operational rules to the service agent according to a rule.

In yet another aspect, an apparatus comprising one or more processors configured to implement the described methods or agents is disclosed.

In yet another aspect, a computer readable medium is disclosed. The computer readable medium stores processor-executable program code that, upon execution by one or more processors, causes implementation of a method described in the present document.

These, and other aspects are disclosed throughout the present document.

DETAILED DESCRIPTION

1. Introduction

Figure 1:
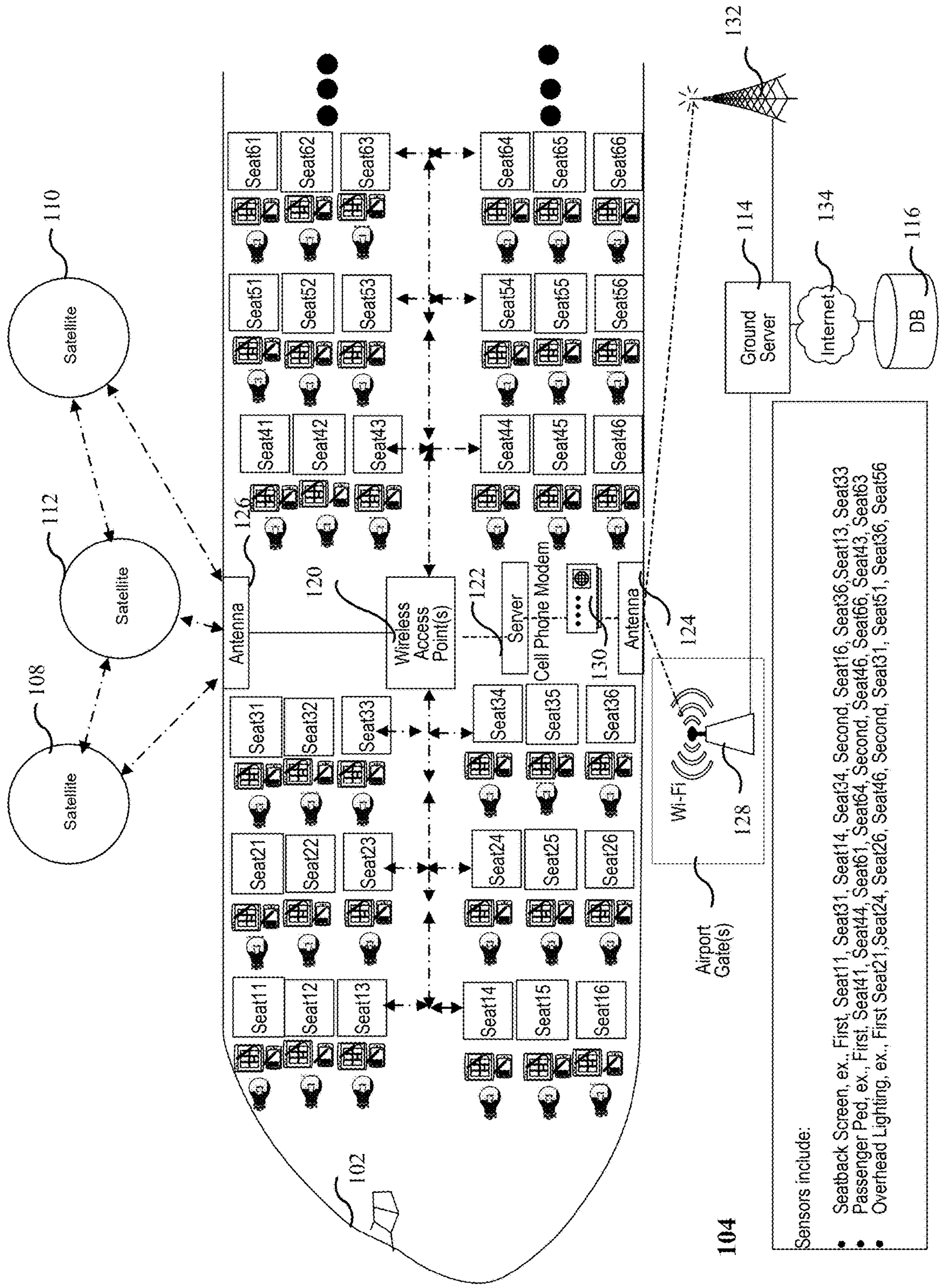
FIG. 1 shows an exemplary airplane depicting an IFE installation.

Among the many advancements in aircraft technology, improvements in passenger comfort and convenience have received much attention. Air travel typically involves journeys over extended distances that at the very least take several hours to complete, so airlines provide onboard in-flight entertainment and communications (IFEC) systems that offer a wide variety of multimedia content for passenger enjoyment. Recently released movies are a popular viewing choice, as are television shows such as news programs, situation and stand-up comedies, documentaries, and so on. Useful information about the destination such as airport disembarking procedures, immigration and custom procedures and the like are also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games that may be played by the passenger.

The specific installation may vary depending on service class, though in general, each passenger seat is equipped with a display device, an audio output modality, an input modality, and a terminal unit. The terminal unit may generate video and audio signals, receive inputs from the input modality, and execute pre-programmed instructions in response thereto. The display device is typically an LCD screen that is installed on the seatback of the row in front of the passenger, though in some cases it may be mounted to a bulkhead or retractable arm, or the like, which is in turn mounted to the passenger's seat. Furthermore, the audio output modality is a headphone jack, to which a headphone, either supplied by the airline or by the passenger, may be connected. Inputs to the terminal unit may be provided via a separate multi-function remote controller or by via a combination touch display. Although the terminal unit and display device were separate components in earlier IFEC implementations, more recently, these components and more may be integrated into a single smart monitor.

The multimedia content is encoded and stored as digital data, with a video decoder and audio decoder of the terminal unit functioning to generate the aforementioned video and audio signals therefrom. It is desirable to have a wide range of different multimedia content to satisfy the varying tastes of passengers. It is also desirable to have a sufficient volume of multimedia content so that passengers can remain occupied with entertainment for the entire duration of the flight. Accordingly, the multimedia content stored onboard the aircraft can range in the hundreds of gigabytes, if not over a terabyte. The majority of the data comprises the video programming, although the audio and video game content may be significant as well. This data is typically not stored on each individual terminal unit, but rather, in a central content server also onboard the aircraft. In this regard, the terminal unit is understood to incorporate networking modalities such as Ethernet to establish data communications with the central content server. Once a particular selection of multimedia content is requested by the passenger via the content selection application, the terminal unit may retrieve the same from the central content server, decode the data, and present it to the passenger.

Because the personal tastes and preferences of passengers can vary considerably, airlines maintain a wide range of multimedia content onboard the content server. Furthermore, in addition to variety of volume, novelty is as important for airlines to keep its passengers engaged with the in-flight entertainment system, particularly for valuable frequent fliers. A variety of modalities, including portable content loaders, wireless modules, and the like may be used to load sets of multimedia content to the content server. The content update process typically takes place on a monthly schedule, preferably during a layover between flights, such as when aircraft maintenance is conducted. For each item of multimedia content loaded on to the IFEC system in this way, however, the airlines must pay a fee. Specifically, the charges are based upon the size of the multimedia content set loaded, as well as the number of cycles or intervals over which the multimedia content is maintained on an aircraft. Scaled to an entire fleet of aircraft, these charges may be substantial, and because they are levied against the entire content set that is loaded on the aircraft, airlines are being charged for content that is viewed less frequently and/or not being viewed at all.

Additionally, there is a growing trend to allow passengers to use their personal electronic devices (PEDs) (e.g., smartphone, laptops, or tablets) for entertainment, which allows passengers to minimize having to touch a commonly exposed surface. The audio or video content provided by the IFEC platform to the PED may include movies, television shows, or other content such as advertisements or flight safety video. Each seatback device has an enclosure that can have a processor executing custom software programs to receive messages or commands from an edge server and to display visual content on a display of the seatback device and to output sound to a headphone jack. Conventional in-vehicle entertainment systems can also wirelessly transmit audio or video content to PEDs that belong to passengers.

The above-described passenger amenities and services are provided using an electronic network that includes video servers, wiring, seatback displays, card readers, wireless network equipment, satellite transmission and reception equipment and so on. Deployment and maintenance of this equipment can be expensive, which requires the airlines to pay attention to which electronic systems and services are used by passengers more frequently or longer. Therefore, it is beneficial for airlines to measure and monitor use of various electronic equipment by passengers. For example, one benefit is to ensure passenger satisfaction, which may lead to the passenger preferring to travel on a particular airline. Another benefit is that airlines are able to find out the electronic systems that are popular and heavily used and may focus their maintenance and replacement resources to ensure that these electronic systems are available to passengers without minimum down time or errors. Situation: no standard way to quantify or qualify passenger engagement (in the cabin)

In the airlines industry, a variety of IFEC installment options are currently deployed. These solutions may include different IFE electronics vendors, different configuration of IFE deployments for different airplane models, different features of IFE systems offered by different airlines, or different types of IFE offered in different geographic areas. Such variations in the IFE deployments often make it difficult to measure effectiveness and use data of IFE electronics across different airlines, different IFE vendors, and different airplane models.

2. Discussion of Machine Learning and Artificial Intelligence

Recent advances in the machine learning technology have made it possible to deploy cost-effective and high-performance machine learning solutions to data analysis and decision making problems. A machine learning model may be trained using ground truth data or using human operator input to learn various patterns or relationships in an input data vector and produce output that can be used in a decision making process. In the airlines industry, airlines operators, service provides and even aviation regulators have to make decisions about various operational aspects of travel on a continuous basis. Specifically, passenger-oriented decision making, i.e., a decision act that directly impacts a passenger's flight experience, often relate to the operation of in-flight entertainment and connectivity network. For example, with the ubiquitous availability of internet connectivity on ground, passengers have begun expecting a similar seamless connectivity during travel. At the same time, airlines are under continuous pressure to provide such a high quality experience to passengers by making smart decisions about the electronic equipment deployed on an airplane to provide connectivity in a high-density situation such as 100 to 300 passengers in a relatively small airplane space.

The present document provides a framework that can be adopted by the airlines industry to introduce use of artificial intelligence based decision assistance data in their operations.

3. Example Implementations for in-Vehicle Computing System and IFEC Deployments

FIG. 1 shows an example system in which the various methods embodiments described in the present document may be implemented. An airplane 102 is depicted to include multiple passenger seats, Seat 11 to Seat 66. The airplane 102 may include an antenna 126 that is configured to communicate with external communication sources such as a satellite network that includes one or more satellites 108, 110, 112. Satellite communication may be used for both downloading information and uploading information. Wi-Fi 128 at airport gate(s) and Cell-phone modem 130 through a Cell Phone Tower 132 may be used to both downloading information and uploading information from/to ground server 114 through the Internet 134 and from/to database 116 as illustrated most notably in FIG. 1.

The airplane 102 may include an onboard server 122, one or more wireless access points 120 and an antenna 124 that is configured for communication with a ground server 114 that includes a database 116.

Also shown in FIG. 1 is an example of a script 104 that is used for collecting sensor data on the airplane 102. The script 104 may include a list of entries that show zones where sensor data, e.g., raw intrinsic data, raw extrinsic data, raw global data, is collected and ordered. For example, the first entry shows that seats 11, 31, 14, 34 are to be first, followed by seats 16, 36, 13 and 33, and so on. Corresponding to each entry, there may be an onboard electronic device on passengers may be alerted for collecting sensor data from a sensor network, for example, including Seatback Display (illustrated by screen icon), Passenger PED (illustrated by and Overhead Lighting (illustrated by light bulb icon).

For example, for the above-listed seats, a message may be displayed on a seatback screen. For the next entry (corresponding to seats 41, 33, 61 and 64) a message may be sent to passengers' personal electronic devices (PEDs) for data sensor collection instructions, e.g., take a survey or complete a questionnaire, and/or as scripted for the sensor data collected by the sensor network about passengers about one or more aspects or incidents (e.g., when, during, what, before, during or at end one or more flights or destinations, number or quantity of or time of or time duration) in their trip, e.g., watching movies, browsing selected live television programs, sports casts, preferences for food, drink, and snack selections, cleanliness of the airplane, crew availability or helpfulness or resolving issues, informativeness of captain about flight and status to destination, and politeness and promptness of aircraft attendants. In one example, as illustrated in FIG. 1, seats 11, 31, 14, 34 (first) and seats 16, 36, 13, and 33 (second) are scripted as passengers for collecting sensor data from the sensor network, e.g., before flight, after flight at designated intervals or upon certain events (e.g., when, during, what, before, during or at end one or more flights or destinations, number or quantity of or time of or time duration), e.g., calling attendant, ordering food, ordering movies, surfing the Internet, using or clicking features of the Seatback Display or, and before, during, or upon deplaning; seats 41, 44, 61, 64 (first) and seats 46, 66, 43, 63 (second) are scripted as passengers for collecting sensor data from the sensor network before flight, after flight at designated intervals or upon certain events (e.g., when, during, what, before, during or at end one or more flights or destinations, number or quantity of or time of or time duration), and during deplaning; and seats 21, 24, 26, 46 (first) and seats 31, 51, 36, 56 (second) are scripted as passengers for collecting sensor data from the sensor network (e.g., when, during, what, before, during or at end one or more flights or destinations, number or quantity of or time of or time duration) before flight, after flight at designated intervals, and during deplaning.

Continuing with FIG. 1, in some embodiments, passengers, individual passenger(s), and/or group(s) of passengers, and/or airline personnel can each select one or more mode(s) for collecting sensor data, e.g., Seatback Screen, overhead lighting, Passenger PED, for example, by entry into to a Seatback Screen, a passenger manifest, or an airline companion app downloaded on a mobile device (a Passenger PED) of a passenger. In some embodiments, passengers and/or individual passenger(s) and/or group(s) of passengers are selected for collecting sensor data in accordance with one or more screening criteria, e.g., when, how often, how, . . . or combinations thereof including: location of origin for flight, location of destination of flight, location of layover flight, news or history of events at origin, destination, or layover flight, monitor passenger health status during flight, traveling together family members, traveling together friends, business partners, and/or any other methods or systems described above or below, adjustments for collecting sensor data, when, how, how much, how often or ordering, for example, physical separation or time gap(s) between passenger seats (as illustrated in FIG. 1), any empty seats or rows, or the like. The server 122 may implement the script described in the present document. The wireless access points 120 may be used for prompting PEDs via messages to deplane. In some embodiments, the wireless access points may be used for detecting PEDs based on signal quality (e.g., signal strength) and this information may be used to determine travel configuration of the airplane during flight. The antenna 124 may be used for communication between the ground server 114 and the server 122. The ground server 114 may provide the server 122 with passenger information, or passenger manifest, prior to the departure of the flight. The ground server 114 may also provide additional information about passenger such as passenger's previous flight history or other social activities such that prior passenger engagements with IFE tracing can be performed.

Figure 2:
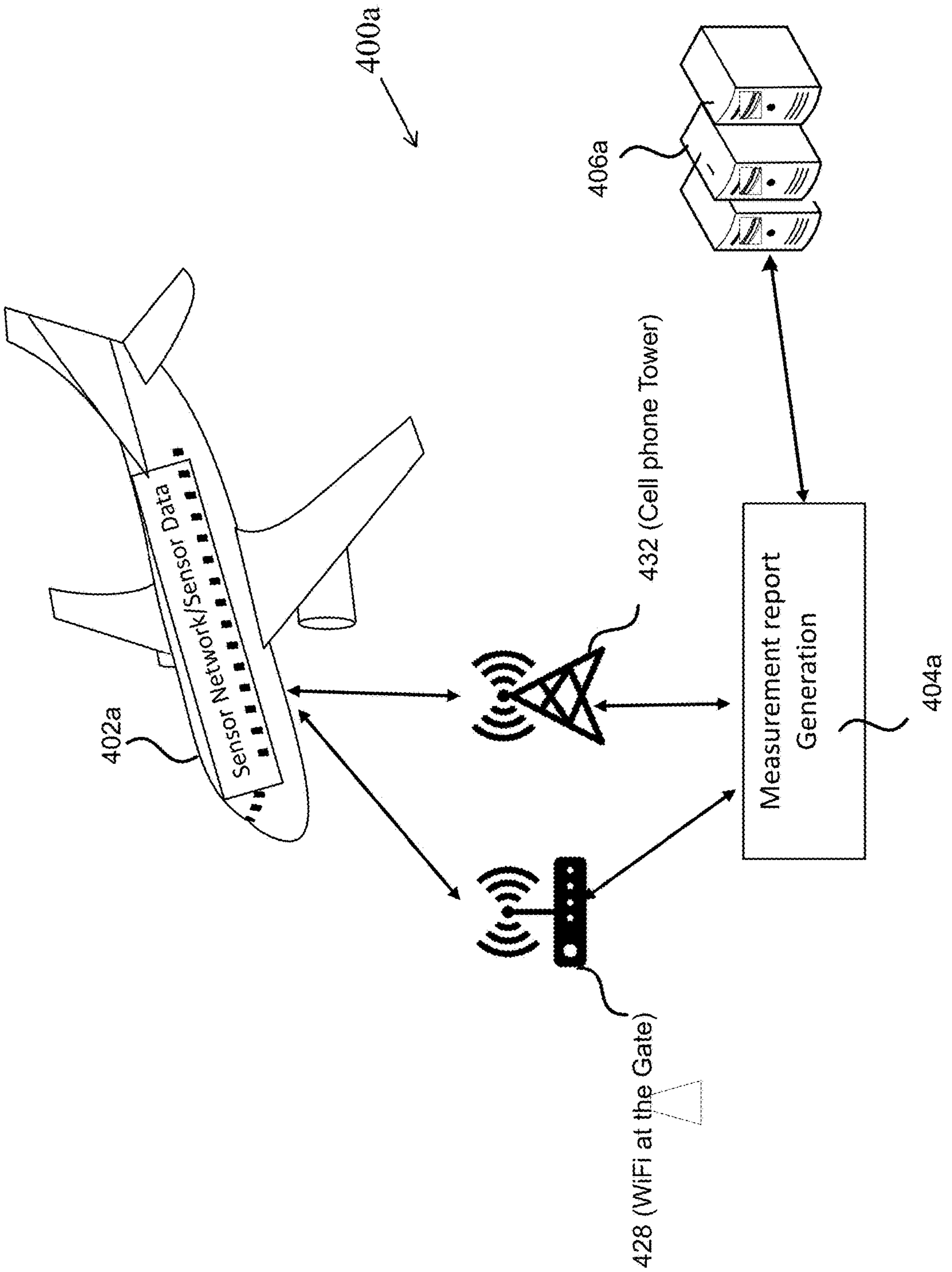
FIG. 2 shows an airline network for sensor data capture and analysis.
Figure 3:
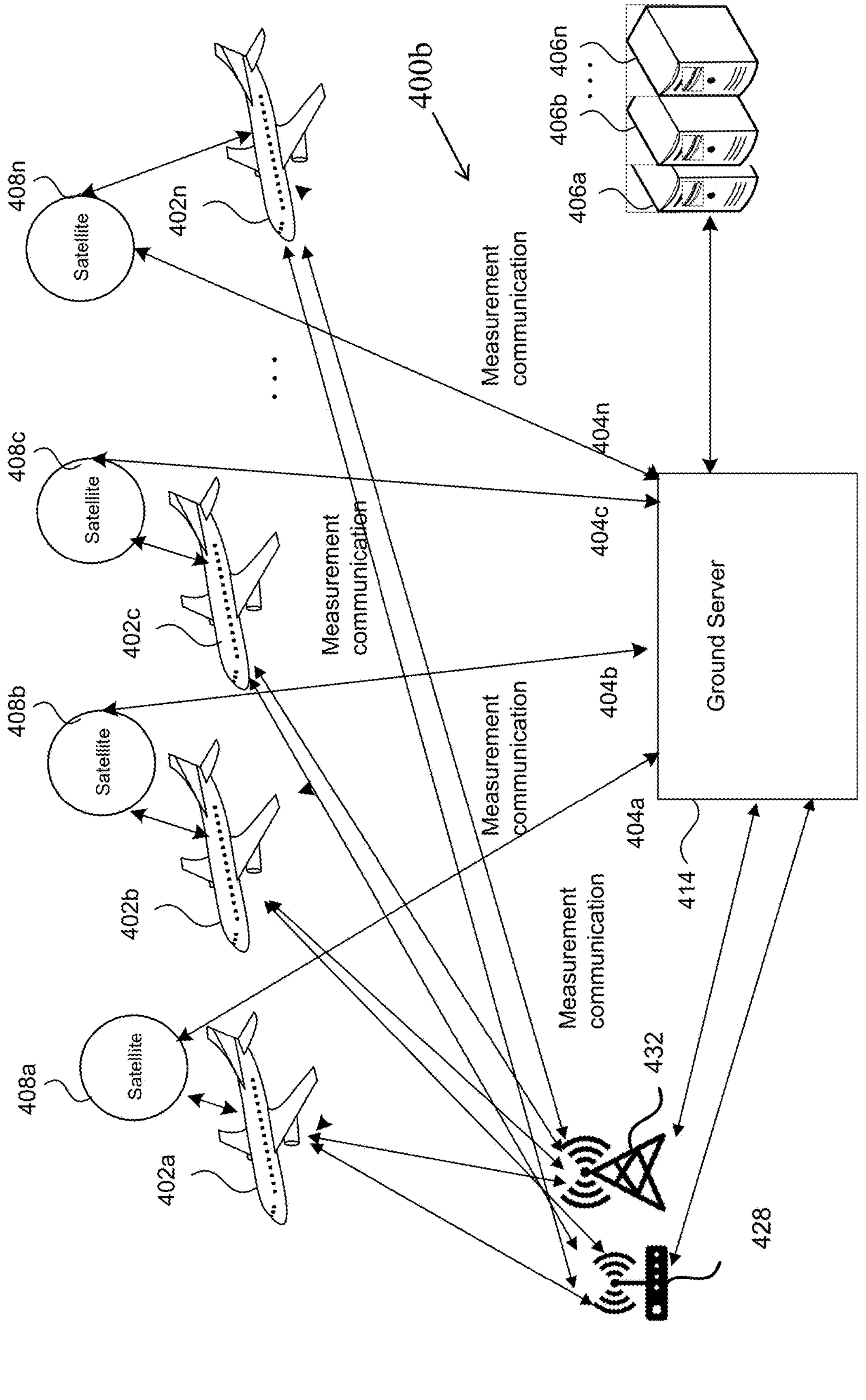
FIG. 3 shows a multiple-airline network for sensor data capture and analysis.

FIGS. 2-3 show an exemplary system for sensor data gathering, processing and measurement report generation (systems 400*a* and 400*b* respectively). In particular, FIGS. 2 and 3 shows a communication network in which sensor network 402*a* and sensor data may be collected and communicated to airplanes. A ground server 414 (which may operate similarly to the ground server 114) may be configured to communicate with airplanes 402*a*, 402*b*, . . . 402*n* either via a direct communication link or through a satellite connection using satellites 408*a*, 408*b*, 408*c*, . . . 408*n*. Databases 406*a*, 406*b*, . . . 406*n* may be used to store passenger information including sensor data that generates measurement report generation 404*a*, 404*b*, 404*c*, . . . 404*n* that creates/defines/pictorially represents passenger preferences, previous flight information, passengers usage information, e.g., IFE, airplane facilities, crew contacts, food and drink purchases, internet usage, products and services viewed, purchased, or saved to be purchased at a later time, etc. The ground server 414 may communicate passenger information including the prescreening information and/or the manifest information and/or boarding and/or deboarding (deplaning) information/plan to an airplane prior to take off. This information may be used by a server on the airplane to alert/adjust sensor network and which sensor data to collect more or less of during, for example, pre-flight, during flight, and end of as described in the present document. In some embodiments, the sensor data gathering, processing and measurement report generation system depicted in FIGS. 2-3 may include equipment that provides wireless communication connectivity between the airplane equipment and ground based server via equipment 428 such as a Wi-Fi access point at the gate, or via a cellular communication equipment such as a cell phone tower 432 that may be available to the airplane at the airport or near gate area. As depicted in FIG. 3, the Wi-Fi and cellular connectivity may also be available to some airplanes during flight.

Figure 4:
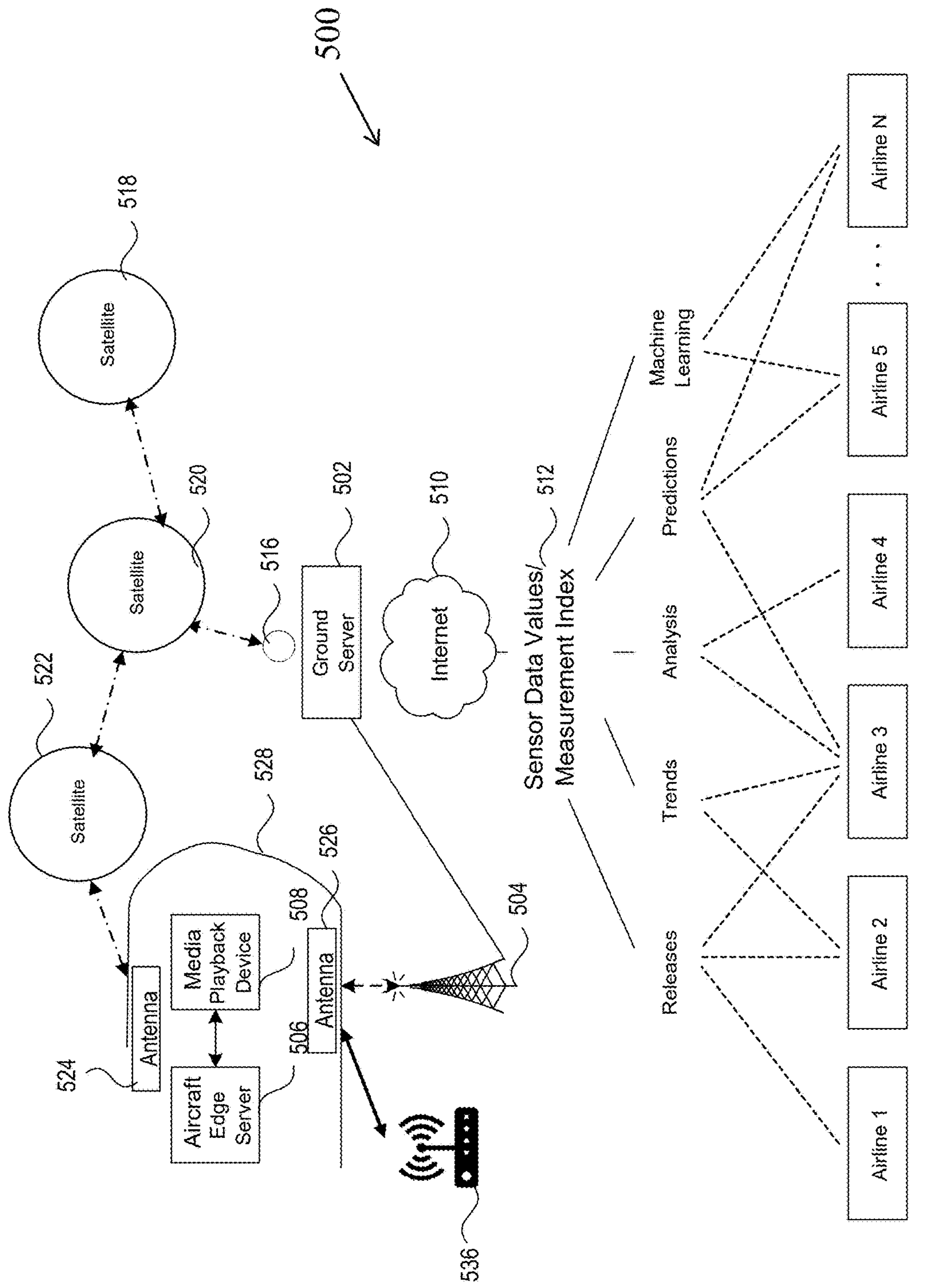
FIG. 4 shows an example of an in-flight entertainment network.

FIG. 4 shows another configuration of a system 500 in which a ground server 502 may use information from multiple flights of multiple airlines (Airline 1, Airline 2 . . . Airline N). FIG. 4 shows another configuration of a system in which a ground server 502 may use information from multiple flights of multiple airlines (Airline 1, Airline 2 . . . Airline N). This information may be processed to, for example, establish trends in information based on sensor data at various previous locations where passengers were, predictions for upcoming flight of passengers in terms of sensor network recordings/reporting of likes and dislikes of passengers, and so on. In some embodiments, machine learning may be used to train a logic to perform trends (e.g., a measurement index) based on prior usage of sensor network and, for example, likes and dislikes and prior behavior/usage by passengers. Results of such analyses may be combined into the passenger information/plan 512 and stored at the ground server 502, possibly via communication through the internet 510. The ground server 502 may communicate the information via a satellite dish 516 with a network of satellites (518, 520, 522), which in turn is received in an airplane via antenna 524 by an onboard server (called edge server 506). The edge server 506 may implement the script described herein, along with providing media data to media playback devices 508 onboard the airplane 528. Alternatively, or in addition, the ground server 502 may communication the information to the edge server 506 through a terrestrial connection such as through cellular communication via a cellular network 504 to a cellular reception antenna 526 onboard the airplane. The ground server 502 may be used, for example, to collect and distribute passenger information regarding watching $3^{rd}$ parties' products and services advertisements and specials. In some embodiments, the connectivity between the ground server 502 and airplane equipment may be based on a local area wireless network (e.g., a Wi-Fi access point 536) or a cellular communication network (e.g., cell tower 504) which may be available to the IFEC for communication while during a flight or when parked at an airport terminal, near the gate area.

4. Example Implementations for Onboard Server Deployments

An IFEC installation may include an onboard server that may be implemented in the form of one or more hardware platforms that include one or more processors, one or more computer memories and network interface for digital data communications. The onboard server may be configured to provide various instructions and content to the seatback displays, the wireless access points, Bluetooth transceivers and collect sensor data from the various onboard sensors. The onboard sensor may also be configured to communicate with a ground server or another server across the internet or a computing cloud for exchanging messages related to the rules to filter the sensor data, collect and transmit the sensor data, and so on. The onboard server may perform such communication in real-time (e.g., using the satellite communication path depicted in FIGS. 1 and 3) or offline such as communicating with the ground sever at the end of a travel segment.

5. Example Implementations for Ground Servers

Similar to the server systems onboard the aircraft described above, the ground server is understood to be a standalone computer system, or multiple standalone computer systems with general purpose data processors, memory, secondary storage, and/or a network interface device for connecting to each other. The computer systems may have an operating system installed thereon, along with the server applications that implement the various components of the system for sensor data collection and processing according to the embodiments disclosed herein. The ground server may store the passenger profiles and/or the rule database as disclosed herein. Various technical solutions described herein may be implemented at the ground server and/or be controlled by a control from the ground server. For example, the aforementioned sensor network measurements and transmission thereof to the ground server may be performed under instructions from a ground server.

6. Example Solutions

To solve the technical problems discussed in the present document, among others, the following technical solutions may be adopted by some preferred embodiments.

Solution 1. A system for providing in-flight connectivity (e.g., system 600 depicted in FIG. 5), comprising: a client agent (e.g., client AI agent 602) configured to communicate sensor data with one or more human-machine interfaces (HMI) deployed in an airplane; a service agent (e.g., services AI agent 606) configured to communicate information with one or more service servers, wherein the service servers are configured to provide services to passengers on the airplane; and a cloud engine (e.g., matching engine 604) deployed on a computing platform that is remote from the airplane, the cloud engine communicatively coupled to the client agent and the service agent and configured to receive (a) sensor information from the client agent and metric information from the service agent, (b) train a machine learning model according to received sensor information and metric information, and (c) provide user interactivity information to the client agent and operational rules to the service agent according to a rule.

Solution 2.1. A system (e.g., system 600 depicted in FIG. 5) for bilaterally matching sets of artificial intelligence (AI)-based information to configure in-vehicle entertainment systems for passengers onboard a vehicle, comprising: (A) a client agent (e.g., client AI agent 602) that is configured to, using a first trained model, select a set of passenger-specific features representing a passenger onboard a vehicle, wherein the set of passenger-specific features are selected in response to a service request made by the passenger via an in-vehicle entertainment system, and wherein the set of passenger-specific features includes at least one feature associated with a passenger action prior to the passenger being onboard the vehicle; (B) a service agent (e.g., services AI agent 606) that is configured to, using a second trained model, determine service interaction information for a plurality of vehicle services that are available to passengers onboard the vehicle, wherein the plurality of vehicle services are identified based on querying a service data server that manages available services onboard one or more vehicles including the vehicle; and (C) a bilateral matching engine (e.g., matching engine 604) deployed on a cloud computing platform that is remote from the vehicle, the bilateral matching engine communicatively coupled to both the client agent and the service agent and configured to generate a response to the service request to be provided via the in-vehicle entertainment system, wherein the response is generated based on a matching between the set of passenger-specific features selected using the first trained model and the service interaction information determined using the second trained model.

Solution 3. The system of any one or more solutions disclosed herein, wherein the machine learning model is configured to increase passenger engagement with an in-flight entertainment system that includes sensors that generate the sensor data.

Solution 4. The system of any one or more solutions disclosed herein, wherein the client agent comprises a data anonymizer that is configured to anonymize passenger information prior to sending to the cloud engine.

Solution 5. The system of any one or more solutions disclosed herein, wherein the client agent is programmable to implement an HMI scheme that specifies which HMI interfaces are to be monitored for sensor data and a type of information to be included in the sensor data.

Solution 6. The system of any one or more solutions disclosed herein, wherein the cloud engine comprises a large language model that is used to learn from passengers' verbal and gesture interactions.

Solution 7. The system of any one or more solutions disclosed herein, wherein the cloud engine is configured to implement a reinforcement learning from human feedback (RLHF) model that is configured to fine tune a human preference database.

Solution 8. The system of any one or more solutions disclosed herein, wherein the service agent includes a customization module configured to learn from passenger interactions and passenger preferences to adapt services offered by the one or more service servers to passengers.

Solution 9. The system of any one or more solutions disclosed herein, wherein the system is configured to operate transparently for the passengers on the airplane.

Solution 10. The system of any one or more solutions disclosed herein, further including a flight agent that is configured to communicate airlines-specific or crew-specific information with the cloud engine.

Solution 11. The system of any one or more solutions disclosed herein, wherein the cloud engine is configured to implement a neural network that uses the machine learning model to provide decision information related to products and services offered to the passengers on the airplane.

Solution 12. The system of any one or more solutions disclosed herein, wherein the client agent is configured to select the at least one feature that captures the passenger action prior to the passenger being onboard the vehicle based on the client agent being communicably coupled to a personal electronic device operated by the passenger.

Solution 13. The system of any one or more solutions disclosed herein, wherein the service request indicates a type of media content to be provided via the in-vehicle entertainment system, and wherein the service interaction information determined by the service agent using the second trained model includes similarity information between different media content of the indicated type that are available on the vehicle.

Solution 14. The system of any one or more solutions disclosed herein, wherein the service interaction information describes at least one of (i) historical use of the plurality of vehicle services on the one or more vehicles including the vehicle, or (ii) similarities between the plurality of vehicle services.

Solution 15. The system of any one or more solutions disclosed herein, wherein the bilateral matching engine is configured to generate the response according to a rule that the response includes a particular vehicle service that (i) has not been previously consumed by the passenger according to the set of passenger-specific features and (ii) is similar, according to the service interaction information, to other vehicle services that the passenger prefers according to the passenger-specific features.

Solution 16. The system of any one or more solutions disclosed herein, wherein the bilateral matching engine is configured to perform the matching using a third trained model implemented on the cloud computing platform.

Solution 17. The system of any one or more solutions disclosed herein, wherein the bilateral matching engine is configured to: (A) detect a passenger selection of a vehicle service subsequent to the in-vehicle entertainment system providing the response; and (B) re-train the third trained model based on the passenger selection based on a reinforcement learning from human feedback (RLHF) technique.

Solution 18. The system of any one or more solutions disclosed herein, wherein the service agent comprises a customization module configured to learn from the passenger's selection of a vehicle service subsequent to the in-vehicle entertainment system providing the response to adapt the available services onboard the one or more vehicles.

Solution 19. The system of any one or more solutions disclosed herein, wherein the bilateral matching engine is configured to provide the response to the in-vehicle entertainment system via a terrestrial network connection.

Solution 20. The system of any one or more solutions disclosed herein, wherein the client agent is configured to select the set of passenger-specific features from sensor data obtained from one or more human-machine interfaces (HMI) deployed in the vehicle or included in the in-vehicle entertainment system, and wherein the client agent is configured to implement an HMI scheme determined using the first trained model, the HMI scheme specifying which HMI interfaces are relevant for monitoring to identify the passenger-specific features.

Solution 21. The system of any one or more solutions disclosed herein, wherein the client agent comprises a data anonymizer that is configured to anonymize the set of passenger-specific features prior to transmitting the set of passenger-specific features to the bilateral matching engine.

Solution 22. The system of any one or more solutions disclosed herein, wherein the bilateral matching engine comprises a large language model that is used to process text-based or audio-based utterances included in the set of passenger-specific features.

Figure 5:
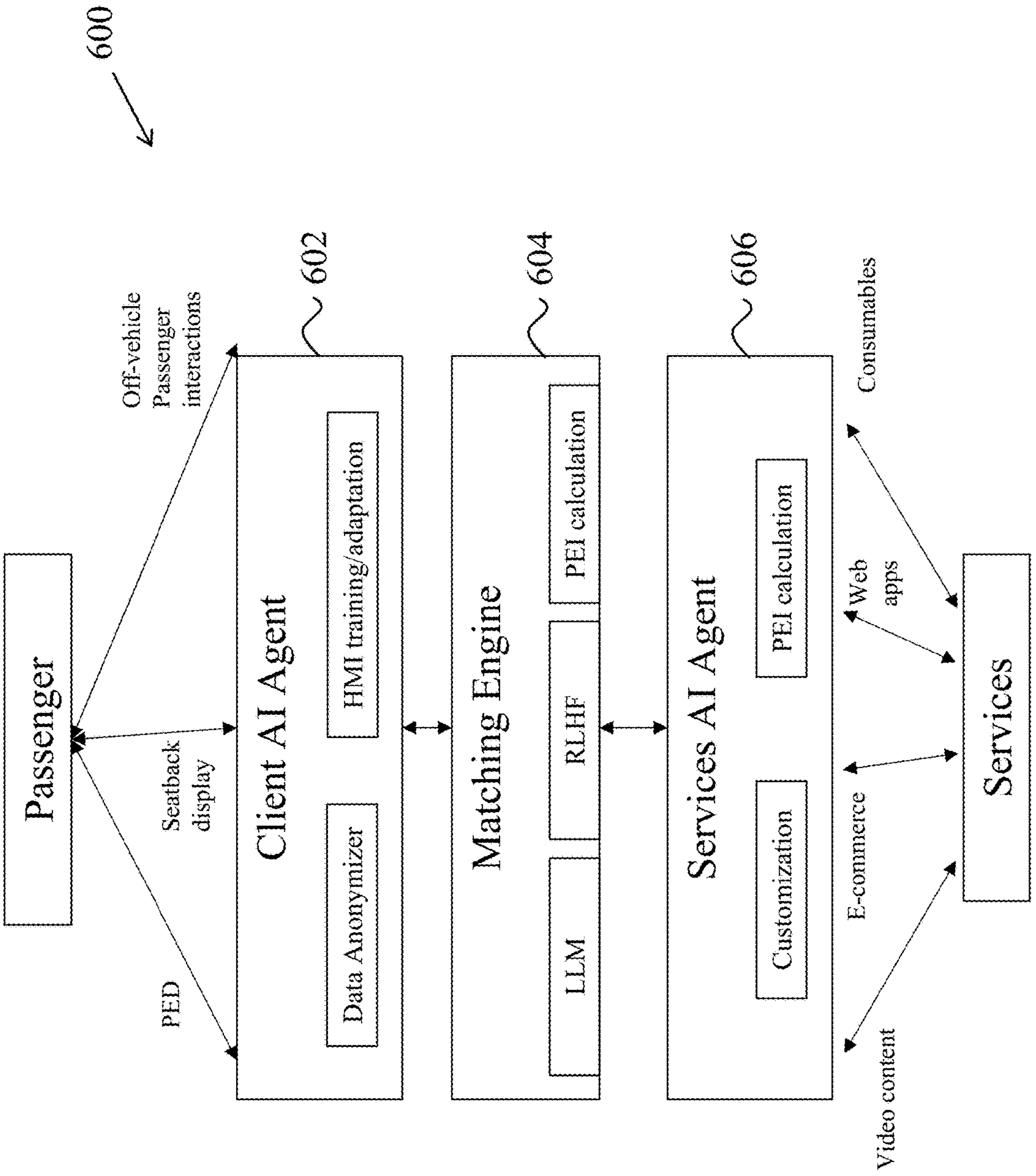
FIGS. 5-6 are diagrams illustrating example systems implementing individual AI agents for passengers and in-vehicle services.

As further depicted in FIG. 5, the client agent 602 may receive passenger interactions through various HMI interfaces. For example, passenger interaction may be received from passenger interaction with a passenger electronic device (PED). As another example, passenger interaction with IFEC may occur through a seatback touchscreen display or through a remote control. As another example, passenger interactions may simply be passenger gestures or spoken words that are picked up by onboard sensors that capture such interactions using a video or image format or may capture passenger words for meaning extraction.

As further depicted in FIG. 5, examples of service servers include a video content server such as a third party server (e.g., Netflix, Prime and the like) or an e-commerce server that allows purchases of services and products or a web app such as a website that includes information (news) or a gaming website.

Figure 7A:
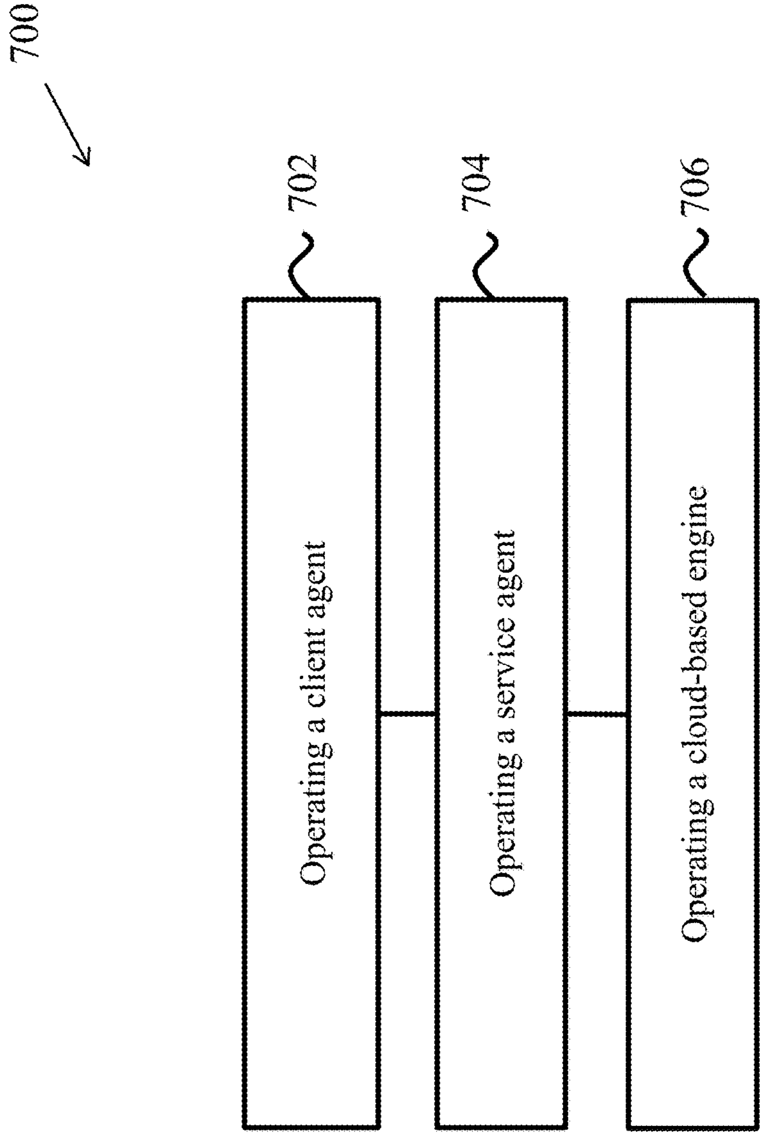
FIGS. 7A-7B are flowcharts illustrating example methods for bilateral implementation of AI agents for passengers and in-vehicle services.

Solution 23. A method of providing in-flight connectivity (e.g., method 700 depicted in FIG. 7A), comprising: operating a client agent (702) to communicate sensor data with one or more human-machine interfaces (HMI) deployed in an airplane; operating a service agent (704) to communicate information with one or more service servers, wherein the service servers are configured to provide services to passengers on the airplane; and operating a cloud or cloud-based engine (706) deployed on a computing platform that is remote from the airplane, the cloud or cloud-based engine communicatively coupled to the client agent and the service agent and configured to receive (a) sensor information from the client agent and metric information from the service agent, (b) train a machine learning model according to received sensor information and metric information, and (c) provide user interactivity information to the client agent and operational rules to the service agent according to a rule.

Figure 7B:
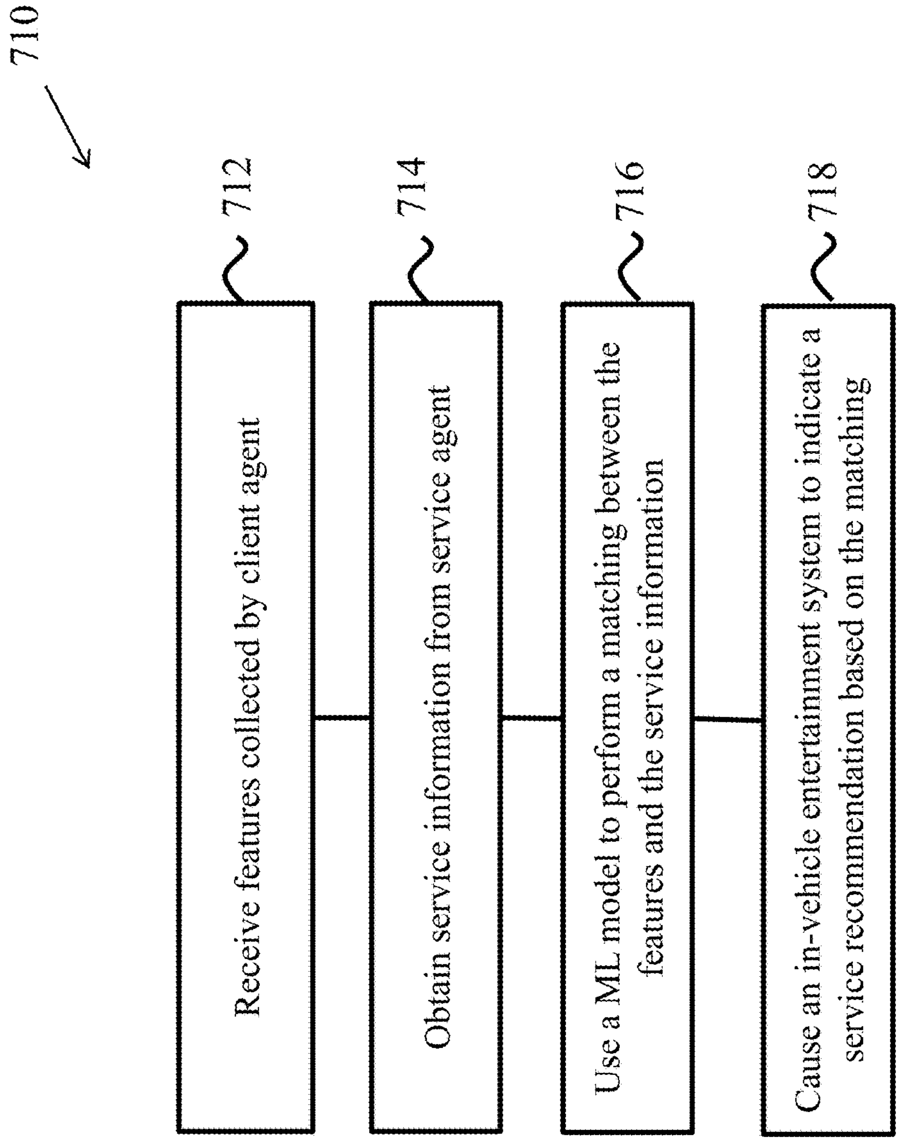

Solution 24. A method of improving specificity of in-vehicle entertainment systems to passengers onboard a vehicle, comprising: selecting, via a first machine learning (ML) model, a set of preference features associated with a passenger onboard a vehicle, in connection to a service request available to the passenger via an in-vehicle entertainment system, wherein the set of preference features includes at least feature associated with a passenger action prior to the passenger being onboard the vehicle; determine, via a second ML model, service interaction information for a plurality of vehicle services that are available to passengers onboard the vehicle, wherein the service interaction information includes at least one of a historical usage of the plurality of vehicle services by a group of passengers or comparisons between the plurality of vehicle services; and operating a matching engine deployed on a cloud computing platform that is remote from the vehicle, the matching engine being configured to: (a) generate a passenger-specific set of vehicle services based on a matching between the set of preference features selected via the first ML model and the service interaction information determined via the second ML model, and (b) cause the in-vehicle entertainment system to indicate the passenger-specific set of vehicle services in response to the passenger selecting the service request via the in-vehicle entertainment system Solution 25. A method of improving specificity of in-vehicle entertainment systems to passengers onboard a vehicle (e.g., method 710 depicted in FIG. 7B), comprising: receiving (712), from a client agent configured to collect activity information for a passenger that is onboard a vehicle, a set of preference features associated with the passenger, the set of preference features including at least one feature associated with a passenger action prior to the passenger being onboard the vehicle; obtaining (714), from a services agent, service interaction information that identifies a plurality of vehicle services that are available in the vehicle for the passenger and that further includes at least one of a historical usage of the plurality of vehicle services by other passengers or comparisons between the plurality of vehicle services; generating (716) a passenger-specific set of vehicle services based on using a machine learning (ML) model to perform a matching between the set of preference features received from the client agent and the service interaction information obtained from the services agent; and causing (718) an in-vehicle entertainment system to indicate the passenger-specific set of vehicle services in response to a service request by the passenger via the in-vehicle entertainment system.

Solution 26. The method of any one or more of the solutions disclosed herein, wherein the machine learning model is configured to increase passenger engagement with an in-flight entertainment system that includes sensors that generate the sensor data.

Solution 27. The method of any one or more of the solutions disclosed herein, wherein the client agent comprises a data anonymizer that is configured to anonymize passenger information prior to sending to the cloud engine.

Solution 28. The method of any one or more of the solutions disclosed herein, wherein the client agent is programmable to implement an HMI scheme that specifies which HMI interfaces are to be monitored for sensor data and a type of information to be included in the sensor data.

Solution 29. The method of any one or more of the solutions disclosed herein, wherein the cloud engine comprises a large language model that is used to learn from passengers' verbal and gesture interactions.

Solution 30. The method of any one or more of the solutions disclosed herein, wherein the cloud engine is configured to implement a reinforcement learning from human feedback (RLHF) model that is configured to fine tune a human preference database.

Solution 31. The method of any one or more of the solutions disclosed herein, wherein the service agent includes a customization module configured to learn from passenger interactions and passenger preferences to adapt services offered by the one or more service servers to passengers.

Solution 32. The method of any one or more of the solutions disclosed herein, wherein the system is configured to operate transparently for the passengers on the airplane.

Solution 33. The method of any one or more of the solutions disclosed herein, further including a flight agent that is configured to communicate airlines-specific or crew-specific information with the cloud engine.

Solution 34. The method of any one or more of the solutions disclosed herein, comprising implementing a neural network that uses the machine learning model to provide decision information related to products and services offered to the passengers on the airplane.

Solution 35. At least one non-transitory computer-readable media storing instructions that, when executed by at least one processor, implements the method of any one or more of the solutions disclosed herein.

Solution 36. At least one non-transitory computer-readable media storing instructions that, when executed by at least one processor, implements the system of any one or more of the solutions disclosed herein.

Solution 37. At least one non-transitory computer-readable media storing instructions that, when executed by at least one processor, implements the client agent, service agent, or matching engine of any one or more of the solutions disclosed herein.

In these solutions, the "agents" which are also called "AI agents" in the present document, may be implemented in software, in hardware, or using a combination of hardware and software.

It will be appreciated by those skilled in the art that the technical solutions provided herein provide improvements to the field of artificial intelligence and machine learning. For example, aircrafts often have limited or no connectivity during travel. Therefore, the data connectivity between ML models that operate in the ground server and the ML models (e.g., the client AI agent 602) may not be reliable and continually available. It is also well-known in the field of machine learning that the dimension of a training data set impacts the complexity and training time of a ML model. The disclosed embodiments benefit from the advantageous splitting of AI agents to be within an airplane, and at a ground server allows implementation to reduce the complexity. For example, at a given time, hundreds of airplanes may be in transit. With each airplane carrying hundreds of passenger seatback and other sensors, the amount of data generated for analysis may be in the range of millions of sensor inputs per minute. The disclosed embodiments can advantageously train the client AI agent to perform compaction of the received data and cull the data to only use and report data that the ground server based AI engine is configured to look at. This way, the complexity can be reduced by a factor of thousands or more.

7. Example Implementations for Bilateral Passenger-Service Matching

As described with respect to FIG. 5, AI/ML may be used to perform data analysis at interfaces to external entities that work together with the IFEC network but are not necessarily controlled by the operator of the IFEC network. One such entity is passengers on the airplane. An AI agent may be deployed to collect data related to passenger interactions with the IFEC system. The data collection may be performed in a manner transparent to the passengers. In other words, passengers need not have to perform any special training of the agents that learn from passenger interactions. One such example is receiving passenger gestures or spoken words, deriving meanings therefrom using an ML model, and continually train the ML model to become more accurate in catching passengers' intent. At the same time, the ML model may also be used to make a decision about product or services provided to the passengers. The other set of external entities includes service provides that provide services or products to airlines passengers. Examples include map service providers, online shopping service providers, and so on. On this interface, data collection may include an amount of time a passenger stays on a particular service provider's website or an amount of money the passenger spends, and so on.

Training of an AI agent can also be implemented for representing and characterizing the different services available to passengers onboard a vehicle. A services agent can (e.g., independently from the client agent) identify the various services or products to a specific passenger or a group of passengers onboard a vehicle and analyze various information related and/or specific to the services or products, thus providing another angle by which services/products can be accurately offered to vehicle passengers. In some embodiments, a services agent may be deployed to generate data related to services provided onboard a vehicle (e.g., via the IFEC system). In an example, the services agent identifies available services, determines or retrieves information related to the historical usage of the available services and/or the similar characteristics among the available services, and make a decision regarding which services should be provided/offered to a passenger given a passenger's request and given characteristics of the passenger. In some embodiments, the services agent may use an ML model to derive relevant characteristics of the available services and may further continually train the ML model to become more accurate in identifying which services may be related to other services that the passenger or other passengers prefer or enjoy.

Certain implementations disclosed herein include both a client agent for manifesting passenger desires with respect to onboard services and a services agent for representing services as consumed or engaged with by passengers. Such implementations may further comprise a matching engine that generates a user-facing selection or recommendation of services that uses both outputs from the client agent and outputs from the services agent. In this regard, a bilateral matching is performed, as the passenger is introduced to certain services based on both artificial intelligence (AI)-based information generated to represent the passenger and AI-based information generated to represent the services. As explained in further detail herein, the bilateral matching is implemented on account of separate and independent agents for the passenger and for the services, which improves data security and recommendation specificity/accuracy. Furthermore, the client agent, which may be implemented at least partially on passenger devices, and the services agent, which may be implemented onboard a vehicle (e.g., in an IFEC system), provide a splitting of AI/ML integration and implementation, thus reducing complexity in storage and computation in any one system.

An illustrative example can be the passenger is a very much interested in white wine and specifically German white wine from Rhine River region. This interest or preference of the passenger may be captured by a client agent associated with the passenger. A services agent may determine whether or not an airplane on which the passenger is traveling offers an exact wine brand that the passenger wants and also captures passenger engagement information among various white wines that are offered on the airplane. For example, the services agent may capture engagement information that passengers who enjoy a given white wine also enjoy a different white wine. As another example, the services agent may assign a passenger engagement score to each of the various white wines that are available based on historical usage and/or passenger feedback. Using the information captured by the client agent and the information determined by the services agent, the airline can, if the exact preferred wine brand is not available on the passenger's flight, select comparable white wine that may be offered from the wine list. The bilateral matching or usage of the client agent's output and the services agent's output maintains recommendation accuracy even when a preferred choice is unavailable, and improves customer experience by pleasantly surprising the passenger and promoting a new brand that passenger may not know about yet is now familiar with.

Another example can be from viewing habits of the passenger and statistics provided by the client agent, the IFEC system (e.g., a matching engine) can match with either continuation of a series that is available inflight and recommending the next episode or matching the passenger movies preference to available media identified by the services agent as likely to be enjoyable for the passenger or similar passengers and eliminating already viewed media content to make a surprisingly new recommendation yielding in higher passenger satisfaction. This matching by the IFEC system may be considered a bilateral matching on the basis of the outputs of a client AI agent (e.g., the viewing habits) and the outputs of a services AI agent (e.g., the identification of the series continuation, next episode, other available media that is likely enjoyable), which may reside on the vehicle and within the IFEC system, being brought together to connect a passenger to a piece of media.

Figure 6:
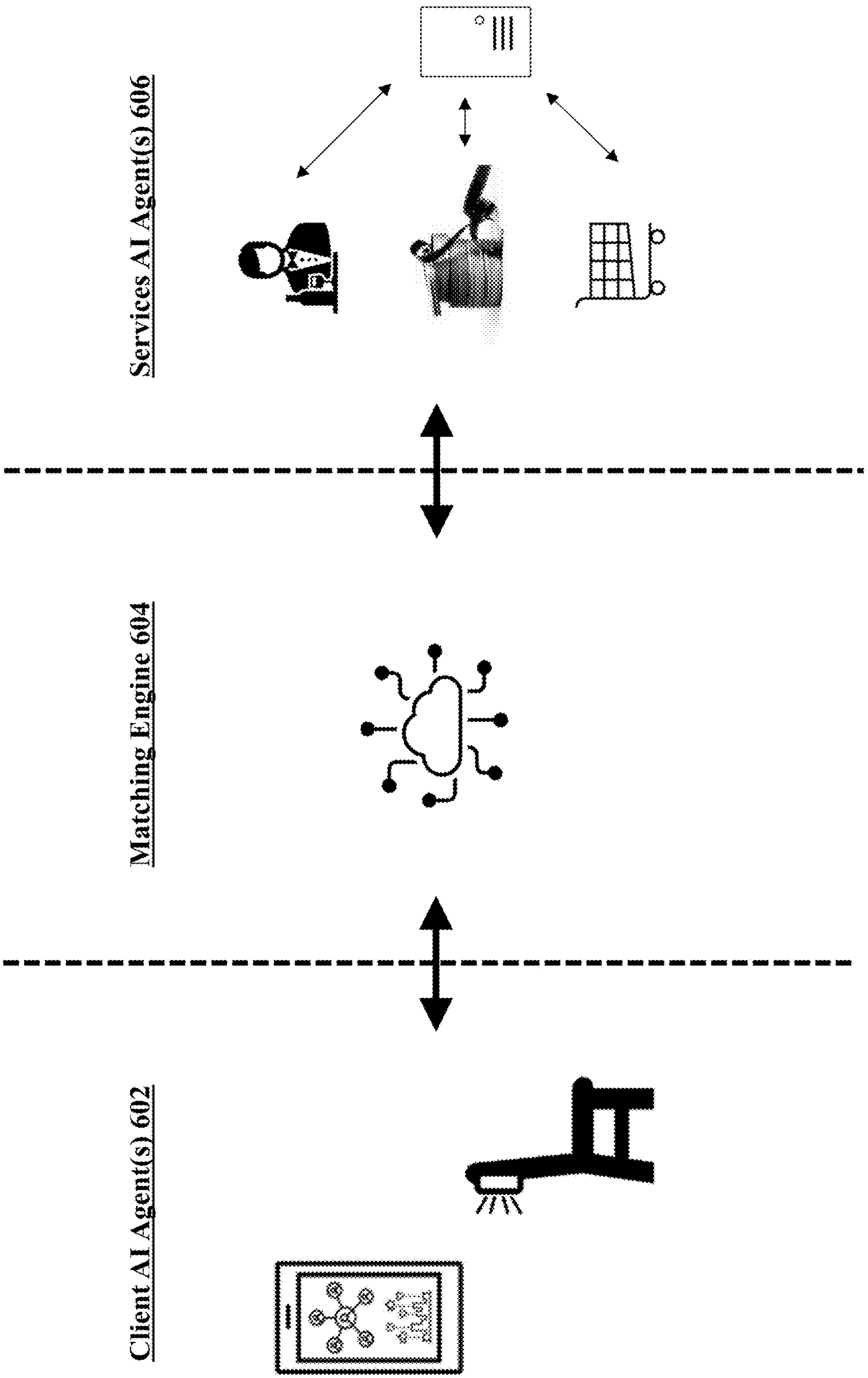

FIGS. 5 and 6 depict the matching of a passenger to one or more recommended services based on bilateral incorporation of client agent insights and services agent insights. As depicted in FIGS. 5 and 6, a client AI agent 602 is associated with a passenger (e.g., collecting information from the passenger's PED and activity sensed onboard the vehicle), while a services AI agent 606 is associated with services available onboard the passenger's vehicle (e.g., based on interfacing with data servers providing or managing the services onboard the vehicle). In some embodiments, the services AI agent 606 may be implemented onboard the vehicle. FIGS. 5 and 6 depict the matching engine 604 existing between the client AI agent 602 and the services AI agent 606; that is, the matching engine 604 is communicably coupled to the client AI agent 602 and the services AI agent 606 such that the matching engine 604 can receive AI-based outputs or insights from each of the client AI agent 602 and the services AI agent 606. The matching engine 604 incorporates its own AI/ML model that is trained to bilaterally incorporate the respective insights of the client AI agent 602 and the services AI agent 606, as well as any applicable rules as discussed herein, to connect a passenger to one or more recommended services.

Example embodiments maintain data privacy and security of passengers, and in particular, of monitored behaviors of the passenger that may be used to inform passenger preference (e.g., wine preferences, viewing habits). Because the client agent is a separate and independent entity from the services agent and the matching engine with strict boundaries between, the personal information of the passenger can be protected within the client agent without direct exposure to the services agent and the matching engine. Accordingly, the private information of the individual never leaves a PED on which the client agent resides.

In some embodiments, only encrypted categories may be transmitted, and the client agent and other system components may be configured to challenge each other to collectively reach a recommendation that they both agree on. In some embodiments, the determination of a match between passenger and services (e.g., a bilateral agreement between client agent and services agent) is based on the highest level of confidence and the variable setup of this confidence. The higher the level the confidence the more of a direct match and as the confidence level is increased from 50% to 80% the value of the confidence increases in terms of the sponsor of the confidence. The highest level of confidence means there is an exact match between what the passenger wants and what IFEC recommendation is and what is being actually offered on board. Thus, disclosed embodiments improve over simple personalization techniques in which passengers provide information via survey to gather information and a flat level of confidence is concluded. Unlike the disclosed embodiments, the pairing between a passenger and services is not challenged and since it is not challenged it will remain static without improving over time and without building a confidence level to make a relative and accurate recommendation based on intelligent learning.

8. Example Implementations for Client AI Agents

In some embodiments, client AI agent 602 is communicably coupled to the passenger PED. For example, the client AI agent 602 resides on the passenger PED or includes an instance or component that resides on the passenger PED. An example of a client AI agent 602 (or a component thereof) includes a travel application (e.g., a user application associated with an airline) that the passenger permits to monitor or track activity across other user applications. The client AI agent 602 may perform functions such as reading the personal information from an individual who has permitted the agent to access and is learning habits and preferences of the person. These statistics are categorized in the encrypted and provide preferences weights (priorities) in information that is exchanged without any of the personal data of the individual leaving their PED.

The client AI agent 602 is configured to collect information relating to passenger preferences, passenger habits, passenger history, and other passenger-specific features that may be relevant to the recommendation of particular onboard or in-vehicle services to the passenger. In some embodiments, the client AI agent 602 collects such information based on passenger's usage and activity on the passenger PED, for example, with other user applications such as food delivery applications, video streaming applications, newsletter subscription applications, and/or the like. As such, at least some of the passenger-specific features collected by the client AI agent 602 correspond to passenger actions or activity prior to the passenger being onboard the vehicle, or "off-vehicle" passenger interactions (e.g., frequent flyer miles-based purchase of services and products, watching content after finishing travel, being on an airline's PED app).

The client AI agent 602 may also collect information that is more contemporary to the passenger being onboard the vehicle. For example, the client AI agent 602 may be communicably coupled to the various sensor implementations disclosed herein, which may sense environmental conditions and passenger actions made within user interfaces of an in-vehicle entertainment system. Accordingly, the client AI agent 602 can extract features contemporary to a passenger's service request (e.g., searching for movies to watch, a menu order for food or wine). Example features that may be obtained via sensor data may include a time at which a service request was made, a relative progress through the vehicle's journey, a location of the passenger within the vehicle, a lighting at the passenger's location within the vehicle, navigation through different menus or interfaces provided on the in-vehicle entertainment system, service selections made by nearby passengers, presence of travel companions with the passenger, and/or the like.

Further, the client AI agent 602 may collect features or insights from one or more digital profiles or personas associated with the passenger. Examples of these digital representations of the passenger may include travel accounts (e.g., a hotel loyalty account, an airline loyalty account), video game accounts, subscription accounts, and/or the like. These digital profiles or personas can include biographical information for the passenger, such as age, residential location, and/or the like, as well as engagement information such as video streaming history, and/or the like. The digital profiles or personas accessible by the client AI agent 602 are affirmatively indicated by the passenger.

While there exist many different features that may be relevant for the client AI agent 602 to collect or monitor (e.g., via the passenger's PED, via sensors), the client AI agent 602 may further be trained to add or eliminate certain features in the input vector. In other words, the machine model may be trained to change the parameters it uses to make a decision. For example, at one time, "destination city" may be used as a parameter in measuring passenger engagement experience. However, over a period of time, an AI/ML model or component of the client AI agent 602 may learn that the services preferred by this passenger have no statistical relationship with destination city and in such a case, destination city may be dropped as a parameter for training. As another example, the client AI agent 602 may learn that the passenger prefers documentary movies over action movies on flights that are later at night, and the client AI agent 602 may accordingly associate a higher weight to a feature representing journey/flight time. In some embodiments, the client AI agent 602 includes an HMI training/adaptation module (as shown in FIG. 5) configured to make these adaptations to weighing, dropping, and/or adding different features that may be collected or monitored by the client AI agent 602. The HMI training/adaptation module may be used to implement an HMI scheme that specifies which HMI interfaces are relevant to monitor to extract the different features. For example, an HMI scheme may indicate that the client AI agent 602 should monitor an HMI interface associated with a video streaming application on the passenger's PED, as well as an overhead lighting control interface at the passenger's seat in the vehicle.

In some embodiments, the client AI agent 602 interacts and safeguards any personal data that is saved and maintained on the PED and tokenizes exchanges with the cloud engine so no personal data of the PED owner is actual shared with the cloud engine directly. As depicted in FIG. 5, the client AI agent 602 includes a data anonymizer module, for example.

9. Example Implementations for Services AI Agents

In some embodiments, the service agent interacts with all available services and application that are proprietary to IFE environment and negotiates with the client agent via the cloud engine, taking into account the personal electronic device limitations for completion of negotiated activities.

In some embodiments, the service agent is configured to inventory all available services. Different services may be available on different vehicles; for example, the services (e.g., media content like movies, consumable items like meals or drinks, e-commerce products) available on a vehicle may depend upon a mobility operator (e.g., airline, rail company, ridesharing company) associated with the vehicle, vehicle class or type, and/or the like. The service agent's identification of available services may further be specific to a passenger. For example, the passenger may be located within a particular cabin in the vehicle in which different services are offered compared to other cabins, or the passenger may be a member of a group of passengers that receive different services (e.g., a priority group, a loyalty program group, a handicap or disability group). In some embodiments, the service agent may inventory available services onboard the vehicle based on being implemented onboard the vehicle. The service agent may be coupled to a system configured for user input, and a vehicle operator (e.g., a flight attendant, a train conductor or crew) may be able to input what services it plans to offer during the journey.

In some embodiments, the service agent is configured to inventory the available services based on communicating with one or more data servers (e.g., service servers) that manage and/or provide services to passengers onboard the vehicle. These data servers may be inventory servers that are used in supply chain operations for supplying vehicles with services such as consumable items. These data servers may include media servers that store media content accessible by passengers via in-vehicle entertainment systems, or web servers providing connectivity to e-commerce platforms on which passengers may purchase products. The data servers with which the service agent may communicate to determine the available services may be remote from the vehicle, ground-based, and/or onboard the vehicle. Generally, the identification of available services may include gathering information or characteristics of each service, such as ingredients, content genre, and/or the like.

Further to identifying the available services, the service agent is configured to generate or determine service interaction information. In some embodiments, the service agent is configured to determine the service interaction information from the one or more data servers. The service interaction information determined by the service agent describes passenger/user engagement with the services. With respect to available media content such as movies, the service agent may determine service interaction information that includes how many viewers consumed each movie, ratings by the viewers of each movie, preferred genres and/or viewing history of viewers that viewed a given movie, progression of viewers through a movie (e.g., did viewers stop watching halfway through), and/or the like, for example. As another example, service interaction information for consumable items such as a wine selection onboard a vehicle may include how many passengers ordered the wine, how the passengers rated the wine, whether the passengers ordered additional bottles of the wine for their destination, and/or the like. In some embodiments, the service interaction information includes a passenger engagement index (PEI).

The service interaction information determined by the service agent may additionally or alternatively describe similarities or comparisons between different available services, which may be with respect to passenger engagement or consumption. For example, for a plurality of movies that are available onboard a vehicle, the service interaction information may describe that passengers who rated a particular movie well also rated another particular movie well. As another example, the service interaction information for movies may identify similar genres between movies, common cast members between movies, and/or the like.

These different features of service interaction information may be selected or weighed according to an AI/ML model implemented by the service agent. Using the AI/ML model, the service agent is configured to learn which features of service interaction information are relevant and accurately capture aspects of the services that guide passenger selections thereof. The learning of the AI/ML model can be guided subsequent to receiving indications of actual passenger selections of services onboard the vehicle. Thus, the service interaction information can be customized and adapt according to more accurately capture passenger intent over time.

The service agent may further use the AI/ML model to determine (e.g., calculate) aspects of the service interaction information. For example, the service agent uses the AI/ML model which is trained to determine a pairwise similarity score between two movies based on average viewer viewing profile/history/preferences. That is, the AI/ML model may be trained to determine similarities between services in aspects meaningful or impactful on passenger consumption and enjoyment, and the particular aspects for the similarity determinations may be learned and re-learned by the AI/ML model.

In some embodiments, given the service interaction information, the service agent may query the cloud engine to match with what is known about the passenger habits (via the client agent) to make a recommendation. In some embodiments, the service agent transmits the service interaction information to the cloud engine, which uses the service interaction information with the passenger-specific features extracted by the client agent to make a recommendation.

In some embodiments, the services agent comprises or is communicably coupled with an IFEC (AI) agent that may be a cloud-based agent having an inventory of all available features and services with statistics based on categories that either match or can be matched with the categories identified by the Client AI agent.

In some embodiments, an example system may include multiple services agents. For example, a system may include a service agent for each type of service available on a vehicle (e.g., video content, e-commerce, web apps, and consumables, as indicated in FIG. 5). In such an example, each service agent is configured to determine services-facing AI insights for the available services in its corresponding type. A particular service agent may then be invoked, called, or communicated with according to a type of service being requested by the passenger. In a further example, a system may include different service agents corresponding to different third-party service providers associated with the services available onboard the vehicle. Given a vehicle that includes movies licensed from multiple different production companies, a system may include a service agent corresponding to each of the multiple different production companies, such that each service agent gathers engagement information from a corresponding one of the production companies for a corresponding set of movies.

10. Example Implementations for IFEC Matching Engines

As shown in FIGS. 5 and 6, the system further includes a matching engine, which may be a cloud engine implemented on a computing platform remote from the vehicles. The matching engine is communicably coupled to both the client AI agent and the services AI agent in order to connect a passenger to one or more recommended services based on bilateral consideration of passenger-facing AI insights received from the client AI agent and services-facing AI insights received from the services AI agent.

In particular, the matching engine is configured to optimize a passenger's service request (e.g., requesting a drink, a movie, a product/service, shopping, and/or the like) between both the passenger-facing AI insights and the services-facing AI insights. In some embodiments, the matching engine is configured to optimize the bilateral use of the passenger-facing AI insights and the services-facing AI insights using an AI/ML model. For example, the matching engine uses the AI/ML model to determine a confidence level between a given recommendation of a service for the passenger, and the confidence level may be determined by the AI/ML model given the passenger-specific features from the client AI agent and the services interaction information from the services AI agent. In some embodiments, the matching engine is configured to use the AI/ML model to determine a confidence level of each of the available services identified by the services AI agent based on the passenger-facing AI insights and given the services-facing AI insights.

In particular, the determination of the confidence level for a pairing between the passenger and an available service is a learnable aspect. For example, the AI/ML model may be trained and re-trained to assign different weights to the passenger-specific features and the service interaction information, or respective portions thereof, based on actual passenger selections of services. In some embodiments, the matching engine is configured to perform reinforcement learning techniques (e.g., reinforcement learning through human feedback (RLHF)) to train and re-train the AI/ML model.

In some embodiments, the matching engine may store and update Large Language Models (LLM) to serve as knowledge base for Client and Service Agents to collaborate and come to consensus on relevant actions and recommendations. In some embodiments, the matching engine uses a LLM to process passenger utterances (e.g., text-based utterances, verbal-based utterances) included in the passenger-specific features. In some embodiments, the cloud engine may be implemented at a ground server computational facility. In some embodiments, the cloud engine may be implemented using cloud computing resources.

The matching engine's determination of a service recommendation for a passenger may be further based on one or more rules. In some embodiments, the matching engine is configured to follow a rule that the recommended service has not previously been consumed by the passenger and is similar to services preferred by the passenger. With this rule, for example, the matching engine may not recommend movies that the passenger has already watched, but will likely enjoy due to similarities to other movies that the passenger does enjoy. An extent to which the matching engine follows or weighs this rule may be trained and/or learned over time, according to the AI/ML model implemented by the matching engine. For example, the matching engine may determine, based on the passenger-facing AI insights from the client agent, that the passenger does not prefer to try new things and may therefore determine not to follow the rule when determining the service recommendation. As another example, the matching engine may determine, based on the information received from the services agent, that the passenger's preferred service is available and none of the other available services are close to the passenger's preferences. In such an example, the matching engine may determine not to follow the rule when determining the service recommendation.

In some embodiments, the matching engine is configured to generate service recommendations for a passenger preemptively before the passenger makes a service request, or even before the passenger is onboard the vehicle. In this manner, the matching engine and the bilateral AI techniques disclosed herein may be implemented in order to plan service available for vehicle journeys preemptively, in some examples. In some embodiments, the matching engine is configured to generate and provide the service recommendations in response to the passenger making the service request, via the in-vehicle entertainment system for example.

Beyond the bilateral use of passenger-facing AI insights and services-facing AI insights, the matching engine may incorporate other information when determining one or more service recommendations for a passenger. For example, the matching engine is communicably coupled to a flight agent, or is configured to obtain vehicle journey information specific to the journey during which the passenger is onboard the vehicle. The vehicle journey information may be AI-based information determined by the flight agent to include relevant features such as crew preferences or airlines preferences, or whether the flight is running exceedingly late or is in a special situation.

11. Example Illustrative Scenarios

Example Scenario 1: A passenger onboard an aircraft makes a request for a drink. Passenger-facing AI insights are collected by a client AI agent associated with the passenger based on the passenger's activities on wine applications, grocery applications, delivery applications, and/or the like on the passenger's PEDs. These activities captured by the client AI agent may have occurred prior to the passenger being onboard the aircraft. Based on the client agent's implementation of an AI/ML model, the passenger-facing AI insights indicate that the passenger prefers a particular wine brand.

Meanwhile, a services AI agent identifies which drinks are available onboard the vehicle. The services AI agent may determine that the particular wine brand is not available onboard. The services AI agent may determine services-facing AI insights that describe user engagement or interactions with the different drinks. For example, the services agent may determine a relationship, among others, between the particular wine brand and another specific wine brand that both are commonly enjoyed by similar passengers. The services agent may determine these services-facing AI insights based on information collected from an airline data server associated with the aircraft, or data servers associated with the manufacturers or brands associated with the wines that are available onboard.

In order to handle the passenger's request for a drink, a matching engine obtains both the passenger-facing AI insights collected by the client AI agent and the services-facing AI insights determined by the services AI agent. The matching engine optimizes the available drink selections and provides a recommended drink that is the other specific wine brand identified in the relationship included in the services-facing AI insights. The recommended drink indicated by the matching engine is based on a confidence level. For example, the confidence level is determined by an AI/ML model implemented by the matching engine that is trained to weigh the passenger-facing AI insights and the services-facing AI insights. The drink recommendation has high specificity and accuracy for the passenger, based on the bilateral incorporation of passenger-facing AI insights and services-facing AI insights.

The confidence level may be specifically calculated, predicted, or determined by the matching engine's AI/ML model based on certain features included in the information gathered by the matching engine. In an example, the matching engine determines a 76% confidence level for the recommendation of a Mondavi™ Cabernet wine for a passenger. The passenger's client AI agent provides information that indicates that 80 out of 100 purchases were for Josh Cellars™ Cabernet wine (a preference weighting of 80%), which all occurred between 5 PM and 8 PM. Sensor data may also be collected (e.g., via the client AI agent) that the passenger's request for a drink is made via the in-vehicle entertainment system at 4:30 PM and that the passenger was navigating a wine section of a drink menu interface provided on the in-vehicle entertainment system just prior. History information may be collected (e.g., via the client AI agent) that the passenger's average purchase history on IFE is $45.36 (can purchase 3 wines for the price of $12.00 and be within the pay range of the passenger). Meanwhile, the services AI agent determines that Josh Cellars™ Cabernet is unavailable but Mondavi™ Cabernet is. The services AI agent further determines services-facing AI insights that 80% of the purchases enjoy Mondavi™ Cabernet and purchase multiple times (80% preference weighting) and that three other Red Wine selections have less than 50% likes (less than 50% preference weighting). The matching engine aggregates these factors and preference weightings to determine the 76% confidence level.

Example Scenario 2: A passenger onboard an aircraft makes a request to watch a movie on an in-vehicle entertainment system. The client AI agent collects passenger-facing information, which indicate that the 10 of the last 20 movies watched by the passenger included actor Brad Pitt and were watched between 5 PM and 8 PM. The passenger-facing information includes sensor data that indicates that the request to the IFE system for movies is at 7:30 PM. The passenger-facing information further includes a passenger history, which indicates that the passenger's average movie viewing history on IFE is one per flight, and that the passenger is 55 years old.

Meanwhile, a services AI agent identifies that the movie Inglourious Basterds© which stars Brad Pitt is available for playback on the IFE system. The services AI agent determines services-facing information, which indicates that 50% of the people who watch this movie watch it in its entirety (50% preference weighting) and that other movies have higher approval ratings 80% (80% preference weighting). The services-facing information further indicates that the average viewer age is between 50 and 60, and that 95% of the movies are watched between 5 PM and 8 PM.

The matching engine recommends the movie Inglourious Basterds© to the passenger in response to the request because (i) this movie is available, (ii) this movie has not been seen by the passenger before, (iii) 50% of similar passengers like this movie, although don't watch it more than once, and (iv) this movie closely matches prior movie selections made by the passenger on her PED. Based on at least these factors, the matching engine determines a 50% confidence level for this recommendation.

Example Scenario 3: A passenger onboard an aircraft makes a request to access an e-commerce platform via the in-vehicle entertainment system. The client AI agent collects passenger-facing information, which indicates that the passenger has made 85 out of the last 100 purchases on Amazon™ or eBay™ for fishing gear between 7 PM and 10 PM. The passenger-facing information further includes sensor data indicating that the request is being made at 8:30 PM and that the passenger was recently conversing with a companion about fishing gear. The passenger-facing information further includes a passenger history, which indicates that the passenger's average purchase history on IFE is $105.00 and that this passenger is 30 years old.

Meanwhile, a services AI agent identifies that the Amazon™ and eBay™ e-commerce platforms are not accessible via the in-vehicle entertainment system, but that the Bass Pro Shops™ e-commerce platform is available. The services AI agent also determines services-facing information, which indicates that 100% of passengers shopping on the Bass Pro Shops™ e-commerce platform like their fishing gear purchases and are repeat customers. The services-facing information also indicates that other available selections like Craigslist has less than 50% likes. The services-facing information further indicates that an average purchase age is between 25 and 45, and that 95% of the fishing gear purchases are between 5 PM and 8 PM.

The matching engine recommends the Bass Pro Shops™ e-commerce platform to the passenger in response to the request, based on 100% (Preference Weighting 100) good reviews (likes) by last 1000 users for fishing purchases and most fishing purchases at Bass Pro Shops™ between 100 to 200 dollars. In an example, the matching engine may determine a confidence level of 76% for this recommendation on 95% of 80% (within the time range approximately of passenger last purchases) and the price within the pay range of the passenger.

Example Scenario 4: A passenger onboard an aircraft makes a request to watch a movie on an in-vehicle entertainment system. The client AI agent collects passenger-facing information, which indicate that the 10 of the last 20 movies watched by the passenger included actor Brad Pitt and were watched between 5 PM and 8 PM. The passenger-facing information includes sensor data that indicates that the request to the IFE system for movies is at 7:30 PM. The passenger-facing information further includes a passenger history, which indicates that the passenger's average movie viewing history on IFE is one per flight, and that the passenger is 55 years old.

Meanwhile, a services AI agent identifies available opportunities through the IFE systems that include a non-fungible token relating to the movie Inglourious Basterds© which stars Brad Pitt, video interview content with Brad Pitt, personal interaction or chatting with Brad Pitt, and/or the like. The services AI agent determines that such digital opportunities for other movies have higher approval ratings 80%, and that the average purchaser age is between 50 and 60.

The matching engine recommends each of these digital opportunities associated with the movie Inglourious Basterds© or the actor Brad Pitt to the passenger in response to the request based on the passenger-facing information and the services-facing information. In an example, the matching engine determines a confidence level of 30%, which may be relatively level due to the uniqueness or lack of data surrounding these digital opportunities.

12. Additional Example Features

It will be appreciated by one of skill in the art that the present document provides an improvement to the existing networks for providing in-light entertainment and connectivity to passengers. In particular, machine learning agents are deployed at interfaces with passengers and service provides to capture interaction data and this information is fed to an AI/ML engine that generates decision data that may be used to control product and services offering, such as which movie titles to offer on a particular flight segment, which method of passenger boarding will work the best, when do dim lights, when to serve food or drinks to passengers, and so on.

Figure 8:
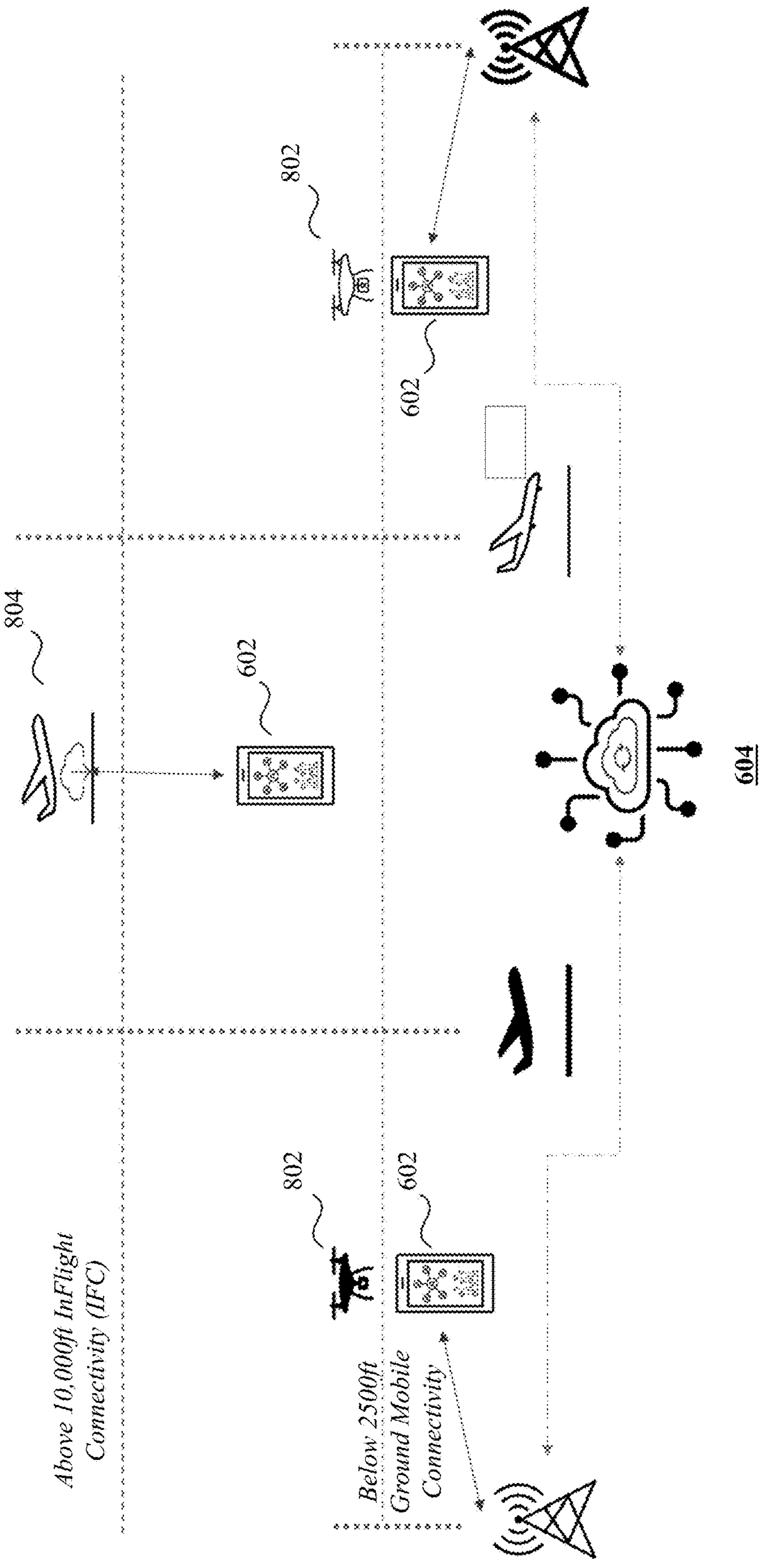
FIG. 8 shows examples of passenger mobility stages in which individual AI agents for passengers and in-vehicle services can be implemented.

The AI/ML system may further be integrated with other value-adds that an IFEC system offers to the users to further enhance passenger experience. As depicted in FIG. 8, a passenger may embark on multiple different stages of a travel journey, and may only be onboard the vehicle for one stage within the travel journey. Additionally, the passenger may be onboard multiple different vehicles throughout the multiple stages of the travel journey, such as starting from an origin onboard a local vehicle (e.g., a ridesharing vehicle and/or an electric vertical take-off and landing (EVTOL) vehicle 802), then moving onboard a commercial vehicle 804 such as a plane or a train, and then disembarking from the commercial vehicle 804 onboard the local vehicle 802 to reach a destination.

The disclosed systems and techniques may be implemented and perform operations across multiple stages of the travel journey, and may be configured to do so based on the solutions disclosed in U.S. application Ser. No. 18/349,768, titled AUTHENTICATED MODIFICATIONS OF MULTI-PARTY LEDGER DATA DURING USER CONNECTIVITY VIA IN-FLIGHT SYSTEMS and filed on Jul. 10, 2023, and U.S. application Ser. No. 18/349,812, titled MOBILE AUTHENTICATION AND CONTROL OF DIGITAL RECORDS CAPTURING REAL-WORLD MULTI-PARTY INTERACTIONS and filed on Jul. 10, 2023, the contents of each of the aforementioned application being incorporated herein by reference in their respective entireties.

For example, a client AI agent may monitor and collect information related to passenger activities in a first travel stage before the passenger reaches a commercial vehicle on which services are available. As a further example, a services AI agent may collect service interaction information for a local vehicle on which the passenger was traveling prior to being onboard a commercial vehicle offering services to the passenger, so that the services AI agent can generate AI-based insights comparing the local vehicle's services and the commercial vehicle's services. As a yet further example, each component of the system may re-train its respective AI/ML model based on service selections made by the passenger throughout the stages of the travel journey, so that more accurate recommendations (or recommendations with higher confidence levels) can be made in subsequent stages of the travel journey.

The components of the disclosed systems are configured to communicate with each other via various communication links or networks across different mobility stages. For example, the matching engine 604 may be configured to communicate with the client AI agent 602 and the services AI agent via ground-based or terrestrial networks, such as telecommunication or cellular networks, local area networks, mesh networks, and/or the like, while the passenger is at local stages of the travel journey, for example, traveling by car or eVTOL to an airport or a train station. Then, when the passenger is in-flight on an aircraft, train, or other high-speed vehicle, the matching engine 604 may rely upon satellite-based networks to communicate with the client AI agent 602 located on the passenger's PED located onboard the vehicle, in some examples.

The following discloses an example process spanning multiple mobility stages of a passenger's travel journey.

1. Below 2500 ft (e.g., a "first" mobility stage), on a commercial vehicle (eVTOL, rideshare vehicle, aircraft), a passenger PED on which a client AI agent resides connects through a ground-based network (e.g., a cellular network), learning from the passenger's interactions and activity with various mobile products and services that the passenger has permitted monitoring on the PED. These may include drink applications, moving applications, shopping applications, and/or the like used by the passenger onboard the commercial vehicle or prior to being onboard the commercial vehicle. The client AI agent may extract various passenger-specific features from the monitored passenger behavior, and the extracted features may form a digital persona of the passenger with service engagement preferences.
2. The client AI agent on the passenger PED communicates with the matching engine on a cloud computing platform, consolidating the passenger engagement goals. Connectivity may be provided by local mobile operator of the vehicle to facilitate the communication. According to example embodiments, the communication between the client AI agent and the matching engine may be via a ledger database or platform; that is, the client AI agent may write the passenger-facing information or insights to a digital records/entries stored on a ledger database that are also accessible by the matching engine on the cloud computing platform. For example, the communication between the client AI agent and the matching engine, and with the services AI agent and other components disclosed herein may be facilitated via the solutions related to ledger databases disclosed in U.S. application Ser. No. 18/470,155, titled SECURITY-ORIENTED VIRTUAL ENVIRONMENT FOR IN-FLIGHT PASSENGER INTERACTIONS and filed Sep. 19, 2023, the contents of which being incorporated herein by reference in its entirety.
3. Meanwhile, a services AI agent that is associated with the in-flight onboard services can also communicate (e.g., via a ledger database, via ground-based networks) with the cloud engine to synchronize services-facing AI insights. This enables matching of onboard locally offered services with passenger's digital persona.
4. Above 10,000 ft, in-vehicle systems may provide connectivity to allow the client AI agent to synchronize with the cloud agent to match usage to IFE stored applications utilizing all interfaces available onboard including video content, e-commerce and other Web applications. For example, the cloud engine and/or a services AI agent may select a drink based on a calculated confidence level obtained by, e.g., a list of drink apps, recommends a movie based on a calculated confidence level obtained from, e.g., a list of movie apps, or shopping items based on a calculated confidence level obtained from, e.g., previous shopping where passenger left off, shared during last interaction between passenger PED and a POS interface or device.
5. Below 2500 ft, passenger can continue to utilize services/products along with interfaces available while the PED on which the client AI agent resides continues to communicate with the cloud engine via ground-based networks to continue to offer and synchronize relevant passenger engagement.
6. Connectivity provided by local mobile operator may allow synchronization or recording (e.g., onto a digital ledger) of services selected by the passenger while onboard the vehicle (e.g., above 10,000 ft), such that system components, including the cloud engine, can use this information to re-train AI/ML components.

Embodiments disclosed herein facilitate and can be integrated with casting functionality between a passenger PED and in-vehicle entertainment systems. In some embodiments, a client AI agent manages the content being displayed on the casting device by maintaining the privacy aspects of applications being used simultaneously on the personal device such as notification and pop-up actions that do not need to be display on the secondary screen. As part of a passenger profile, such settings are tokenized and secured on the personal device in a vault for future reference and to assist in the machine learning of the habits of the individual and keeping a porting on the personal device along with any relevant digital rights management component required to play back licensed audio and video. The private notifications would not interrupt the casting in progress on the secondary screen and would be limited to the personal device. The settings are recommended by the AI system however, modifications and exception can be configured by the user via the personal device. As such casting moves the process to the device being cast on freeing up the personal device to minimize power consumption or to dedicate processing power to activities other that the playback of media on the secondary target device. This would allow passenger to take advantage of the 4K and above capabilities of the secondary screen while allowing the AI layer to determine any limitation on the location regional and country regulations and limitation for the application or video to be casted to the secondary display (IFE or any other casting capable display).

Figure 9:
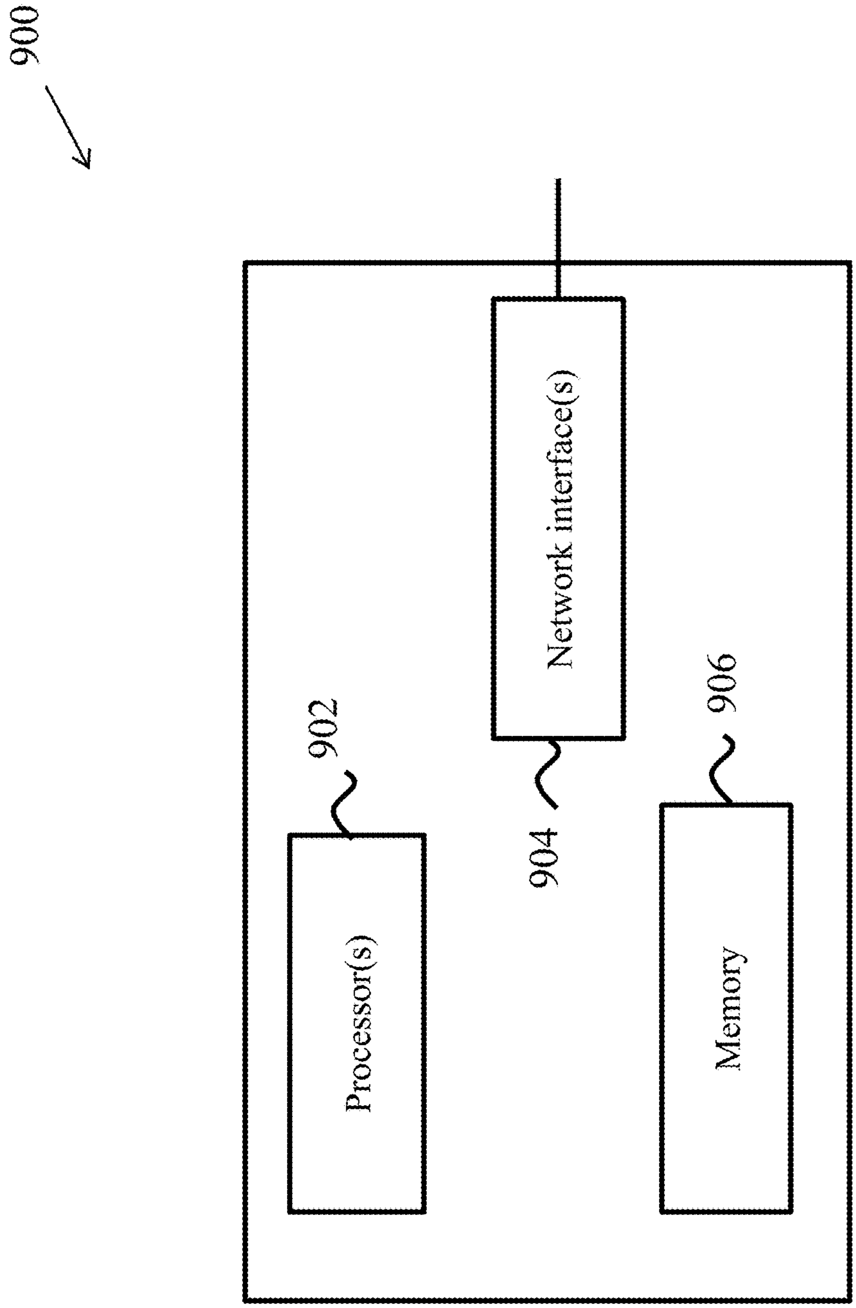
FIG. 9 is a block diagram of a hardware platform on which methods disclosed in the present document may be implemented.

FIG. 9 shows an example of a hardware platform 900 that may be used for implementing various methods and ML algorithms or engines disclosed in the present document. The hardware platform may be implemented as a single physical unit, multiple units (e.g., a server chassis or a server farm) or as a distributed set of computing resources (e.g., cloud resources). The hardware platform 900 may include one or more processors 902 configured to execute code. The hardware platform 900 may include one or more network interfaces 904 (wired or wireless) configured to input or output data (e.g., sensor data, measurement indexes, rules, etc.) between the hardware platform 900 and other parts of the system. The hardware platform 900 may include one or more computer-readable memories 906. The memories 906 may be optionally external or internal to the processor(s) 902. The one or more memories 906 may store processor-executable code for implementing a method disclosed in the present document.

13. Remarks

The embodiments set forth herein represent the necessary information to enable those skilled in the art to practice the embodiments and illustrate the best mode of practicing the embodiments. Upon reading the description in light of the accompanying figures, those skilled in the art will understand the concepts of the disclosure and will recognize applications of these concepts that are not particularly addressed herein. These concepts and applications fall within the scope of the disclosure and the accompanying solutions.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A system for bilaterally matching sets of artificial intelligence (AI)-based information to configure in-vehicle entertainment systems for passengers onboard a vehicle, comprising:

a client agent that is configured to, using a first trained model, select a set of passenger-specific features representing a passenger onboard a vehicle, wherein the set of passenger-specific features are selected in response to a service request made by the passenger via an in-vehicle entertainment system, and wherein the set of passenger-specific features includes at least one feature associated with a passenger action prior to the passenger being onboard the vehicle, wherein the client agent is implemented at least partially on passenger devices;

a service agent that is configured to, using a second trained model, determine service interaction information for a plurality of vehicle services that are available to passengers onboard the vehicle, wherein the plurality of vehicle services are identified based on querying a service data server that manages available services onboard one or more vehicles including the vehicle, wherein the service agent and the client agent are separate and independent from one another; and a bilateral matching engine deployed on a cloud computing platform that is remote from the vehicle, the bilateral matching engine communicatively coupled to both the client agent and the service agent and configured to generate a response to the service request to be provided via the in-vehicle entertainment system, wherein the bilateral matching engine is configured to generate the response by matching between the set of passenger-specific features selected using the first trained model and the service interaction information determined using the second trained model.

2. The system of claim 1, wherein the client agent is configured to select the at least one feature that captures the passenger action prior to the passenger being onboard the vehicle based on the client agent being communicably coupled to a personal electronic device operated by the passenger.

3. The system of claim 1, wherein the service request indicates a type of media content to be provided via the in-vehicle entertainment system, and wherein the service interaction information determined by the service agent using the second trained model includes similarity information between different media content of the indicated type that are available on the vehicle.

4. The system of claim 1, wherein the service interaction information describes at least one of (i) historical use of the plurality of vehicle services on the one or more vehicles including the vehicle, or (ii) similarities between the plurality of vehicle services.

5. The system of claim 1, wherein the bilateral matching engine is configured to generate the response according to a rule that the response includes a particular vehicle service that (i) has not been previously consumed by the passenger according to the set of passenger-specific features and (ii) is similar, according to the service interaction information, to other vehicle services that the passenger prefers according to the passenger-specific features.

6. The system of claim 1, wherein the bilateral matching engine is configured to perform the matching using a third trained model implemented on the cloud computing platform.

7. The system of claim 6, wherein the bilateral matching engine is configured to:

detect a passenger selection of a vehicle service subsequent to the in-vehicle entertainment system providing the response; and re-train the third trained model based on the passenger selection based on a reinforcement learning from human feedback (RLHF) technique.

8. The system of claim 1, wherein the service agent comprises a customization module configured to learn from the passenger's selection of a vehicle service subsequent to the in-vehicle entertainment system providing the response to adapt the available services onboard the one or more vehicles.

9. The system of claim 1, wherein the bilateral matching engine is configured to provide the response to the in-vehicle entertainment system via a terrestrial network connection.

10. The system of claim 1, wherein the client agent is configured to select the set of passenger-specific features from sensor data obtained from one or more human-machine interfaces (HMI) deployed in the vehicle or included in the in-vehicle entertainment system, and cull the sensor data for reporting such that reported data includes only data that a remote artificial intelligence agent is configured to look at, and wherein the client agent is configured to implement an HMI scheme determined using the first trained model, the HMI scheme specifying which HMI interfaces are relevant for monitoring to identify the passenger-specific features.

11. The system of claim 1, wherein the client agent comprises a data anonymizer that is configured to anonymize the set of passenger-specific features prior to transmitting the set of passenger-specific features to the bilateral matching engine.

12. The system of claim 1, wherein the bilateral matching engine comprises a large language model that is used to process text-based or audio-based utterances included in the set of passenger-specific features.

13. A method of improving specificity of in-vehicle entertainment systems to passengers onboard a vehicle, comprising:

selecting, via a first machine learning (ML) model, a set of preference features associated with a passenger onboard a vehicle, in connection to a service request available to the passenger via an in-vehicle entertainment system, wherein the set of preference features includes at least feature associated with a passenger action prior to the passenger being onboard the vehicle;

determine, via a second ML model, service interaction information for a plurality of vehicle services that are available to passengers onboard the vehicle, wherein the service interaction information includes at least one of a historical usage of the plurality of vehicle services by a group of passengers or comparisons between the plurality of vehicle services wherein the first ML model and the second ML model are implemented separately and independently from one another; and operating a bilateral matching engine deployed on a cloud computing platform that is remote from the vehicle, the bilateral matching engine being configured to:

generate a passenger-specific set of vehicle services based on a matching between the set of preference features selected via the first ML model and the service interaction information determined via the second ML model, and cause the in-vehicle entertainment system to indicate the passenger-specific set of vehicle services in response to the passenger selecting the service request via the in-vehicle entertainment system.

14. The method of claim 13, wherein the passenger-specific set of vehicle services is generated according to a rule that the passenger-specific set includes a particular vehicle service that (i) has not been previously consumed by the passenger and (ii) is similar, according to the service interaction information, to other vehicle services that the passenger prefers according to the set of preference features associated with the passenger.

15. The method of claim 13, wherein the plurality of vehicle services includes any one or more of a plurality of media content available for playback via the in-vehicle entertainment system, a plurality of consumable items, and a plurality of products available for remote purchase via the in-vehicle entertainment system.

16. The method of claim 13, wherein the first ML model is implemented via a client agent that is configured to monitor particular activity on a personal electronic device associated the passenger, the particular activity being identified by the passenger and being used as input to the first ML model to identify the set of preference features.

17. The method of claim 13, wherein the bilateral matching engine is configured to generate the passenger-specific set of vehicle services using a third ML model that is trained to optimize the matching between the set of preference features and the service interaction information.

18. The method of claim 17, wherein the bilateral matching engine is configured to re-train the third ML model using a reinforcement learning process based on a passenger selection of a vehicle service subsequent to passenger-specific set of vehicle services being indicated via the in-vehicle entertainment system.

19. The method of claim 13, wherein the matching engine is configured to transmit the passenger-specific set of vehicle services to the in-vehicle entertainment system via one of a ground-based connection or a satellite-based connection.

20. A computing system that is remote to a vehicle, the computing system comprising:

at least one processor; and at least one memory storing instructions that, when executed by the at least one processor, cause the computing system to:

receive, from a client agent configured to collect activity information for a passenger that is onboard a vehicle, a set of preference features associated with the passenger, the set of preference features including at least one feature associated with a passenger action prior to the passenger being onboard the vehicle wherein the client agent is implemented at least partially on passenger devices, obtain, from a services agent, service interaction information that identifies a plurality of vehicle services that are available in the vehicle for the passenger and that further includes at least one of a historical usage of the plurality of vehicle services by other passengers or comparisons between the plurality of vehicle services, wherein the service agent and the client agent are separate and independent from one another, generate a passenger-specific set of vehicle services based on using a machine learning (ML) model to perform a bilateral matching between the set of preference features received from the client agent and the service interaction information obtained from the services agent, and cause an in-vehicle entertainment system to indicate the passenger-specific set of vehicle services in response to a service request by the passenger via the in-vehicle entertainment system.

* * * * *